United States Patent [19]

Kemp et al.

[11] Patent Number: 5,983,017
[45] Date of Patent: Nov. 9, 1999

[54] VIRTUAL MONITOR DEBUGGING METHOD AND APPARATUS

[75] Inventors: Steven R. Kemp, Loveland; Clifford A. Whitehill; Alan D. Poeppleman, both of Fort Collins, all of Colo.

[73] Assignee: LSI Logic Corporation, Milpitas, Calif.

[21] Appl. No.: 08/745,526

[22] Filed: Nov. 12, 1996

[51] Int. Cl.[6] .................................................. G06F 11/00
[52] U.S. Cl. ............... 395/704; 395/500.05; 395/500.34; 395/500.44; 714/30; 714/46; 714/724
[58] Field of Search ............................... 395/183.14, 704, 395/712, 183.06, 183.13–183.15, 183.21, 185.01, 500, 500.05, 500.34, 500.43, 500.44, 527; 364/490, 488, 578; 371/22.1, 22.31, 22.5, 22.6; 714/30, 37–39, 45, 48, 724, 46, 726, 733, 734

[56] References Cited

U.S. PATENT DOCUMENTS

| | | | |
|---|---|---|---|
| 5,228,039 | 7/1993 | Knoke et al. | 371/19 |
| 5,287,460 | 2/1994 | Olsen et al. | 395/275 |
| 5,325,368 | 6/1994 | James | 371/22.3 |
| 5,355,369 | 10/1994 | Greenberger | 371/22.3 |
| 5,386,565 | 1/1995 | Tanaka et al. | 395/704 |
| 5,428,624 | 6/1995 | Blair et al. | 371/22.3 |
| 5,434,804 | 7/1995 | Bock et al. | 364/579 |
| 5,440,723 | 8/1995 | Arnold et al. | 295/183.14 |
| 5,455,936 | 10/1995 | Maemura | 395/183.11 |
| 5,479,652 | 12/1995 | Dreyer et al. | 395/183.06 |
| 5,483,518 | 1/1996 | Whetsel | 370/13 |
| 5,488,688 | 1/1996 | Gonzales et al. | 395/183.1 |
| 5,590,354 | 12/1996 | Klapproth et al. | 395/183.06 |
| 5,704,034 | 12/1997 | Circello | 395/183.14 |
| 5,708,773 | 1/1998 | Jeppesen et al. | 395/183.06 |
| 5,737,516 | 4/1998 | Circello et al. | 395/183.14 |
| 5,768,152 | 6/1998 | Battaline et al. | 702/186 |

FOREIGN PATENT DOCUMENTS

| | | | |
|---|---|---|---|
| 0652516 | 5/1995 | European Pat. Off. | G06F 11/100 |
| 0720093 | 7/1996 | European Pat. Off. | G06F 11/00 |
| 2266606 | 11/1993 | United Kingdom | G06F 11/22 |
| 2289147 | 11/1995 | United Kingdom | G06F 11/22 |

OTHER PUBLICATIONS

Winters, M. "Using IEEE–1149.1 For In–Circuit Emulation," Conference Record of WESCON/94, Idea/Microelectronics, pp. 525–528, Sep. 1994.

Chenoweth et al. "Embedding Virtual Test Points in PCBs," Conference Record of WESCON/94, Idea/Microelectronics, pp. 529–533, Sep. 1994.

*Primary Examiner*—Tariq R. Hafiz
*Assistant Examiner*—Tuan Q. Dam

[57] ABSTRACT

A virtual monitor controller includes a data storage device coupled to receive and output data; an instruction storage device coupled to receive and output instructions; a status storage device coupled to receive and output status data; and a mode storage device coupled to receive and output mode data. The virtual monitor controller is included in a debugger/monitor controller. A debugger/monitor system comprises a host system; the debugger/monitor controller; and a digital processor. Preferably, the controller is coupled between the processor and IC logic. A method of operating a virtual monitor comprises the steps of intercepting an instruction fetch from a microprocessor; downloading instructions from a host computer; and operating the microprocessor with the instructions. Preferably, the instructions are sequentially downloaded.

21 Claims, 14 Drawing Sheets

VIRTUAL MONITOR DEBUGGING METHOD AND APPARATUS

FIELD OF THE INVENTION

The present invention relates to an integrated circuit testing device and method, and in particular to a debugging method and corresponding apparatus for a debugger monitor embedded in an integrated circuit.

BACKGROUND OF THE INVENTION

As integrated circuits evolve, their complexity and density are increasing. Testing of these integrated circuits and the corresponding firmware is becoming more difficult. To complicate matters, some regions of logic on the integrated circuit are functionally more complex than surrounding logic regions. A microprocessor or a microcontroller embedded in the integrated circuit is an example of a complex logic region.

Access to the data, address or control signals of the embedded device allow the user to attach an analyzer to trace the paths of the embedded device for testing purposes. However, the user may not have access to the signals. Without access to these signals, the user has no way of determining how the embedded device is functioning during testing.

One technique for testing and debugging the firmware and the embedded device, and for testing the other regions of logic contained in the integrated circuit is known as a monitor program. The monitor program monitors the embedded device software. The monitor program, linked with the embedded device software, is located in the integrated circuit's memory, such as read-only memory (ROM). A universal asynchronous receiver-transmitter (UART) or equivalent circuitry is typically required for communication between the integrated circuit and user test hardware. The communication is typically provided over a serial interface, e.g. RS232.

Many disadvantages exist in using a monitor program. The monitor program requires the integrated circuit's memory, either for data or programs; has to be linked with the embedded device software; is usually hard-coded and thus cannot be easily modified; the serial interface is inherently slow compared to other communication speeds; usually cannot detect complicated "bugs"; and is capable of only debugging the embedded device software. In particular, the amount of memory required for a monitor program can be about 1K–2K. This adds a cost to the product that customers are not willing to pay.

Another technique provides an in-circuit emulator (ICE) in the integrated circuit. The ICE duplicates and imitates behavior of the integrated circuit by executing software coded for the integrated circuit. An ICE monitor external to the integrated circuit generates ICE test signals that are output to the integrated circuit. In response, the ICE monitor receives signals from the ICE for evaluation.

The use of the ICE is not without several disadvantages. The ICE can require extra circuitry on the integrated circuit, and must be functionally designed into the logic of the integrated circuit. As a consequence, design time and cost, and chip area increase. Moreover, external communication to the ICE is conventionally achieved through a set of dedicated ICE pins. However, the pins of an integrated circuit are becoming more of a premium as density and complexity increase, making dedicated ICE pins infeasible.

In light of the above discussion, there exists a need for a debug capability for firmware of an embedded device that minimizes cost. The present invention meets this need.

SUMMARY OF THE INVENTION

The present invention is directed to a virtual monitor controller that comprises a data storage device coupled to receive and output data; an instruction storage device coupled to receive and output instructions; a status storage device coupled to receive and output status data; and a mode storage device coupled to receive and output mode data.

The virtual monitor controller is included in a debugger/monitor controller. A debugger/monitor system comprises a host system; the debugger/monitor controller; and a digital processor. Preferably, the controller is coupled between the processor and IC logic.

The present invention also includes a method of operating a virtual monitor comprising the steps of intercepting an instruction fetch from a microprocessor; downloading instructions from a host computer; and operating the microprocessor with the instructions. Preferably, the instructions are sequentially downloaded.

Numerous other advantages and features of the present invention will become readily apparent from the following detailed description of the invention and the embodiments thereof, from the claims and from the accompanying drawings in which details of the invention are fully and completely disclosed as a part of this specification.

DETAILED DESCRIPTION OF THE DRAWINGS

DETAILED DESCRIPTION OF THE PREFERRED EMBODIMENT

Figure 1:
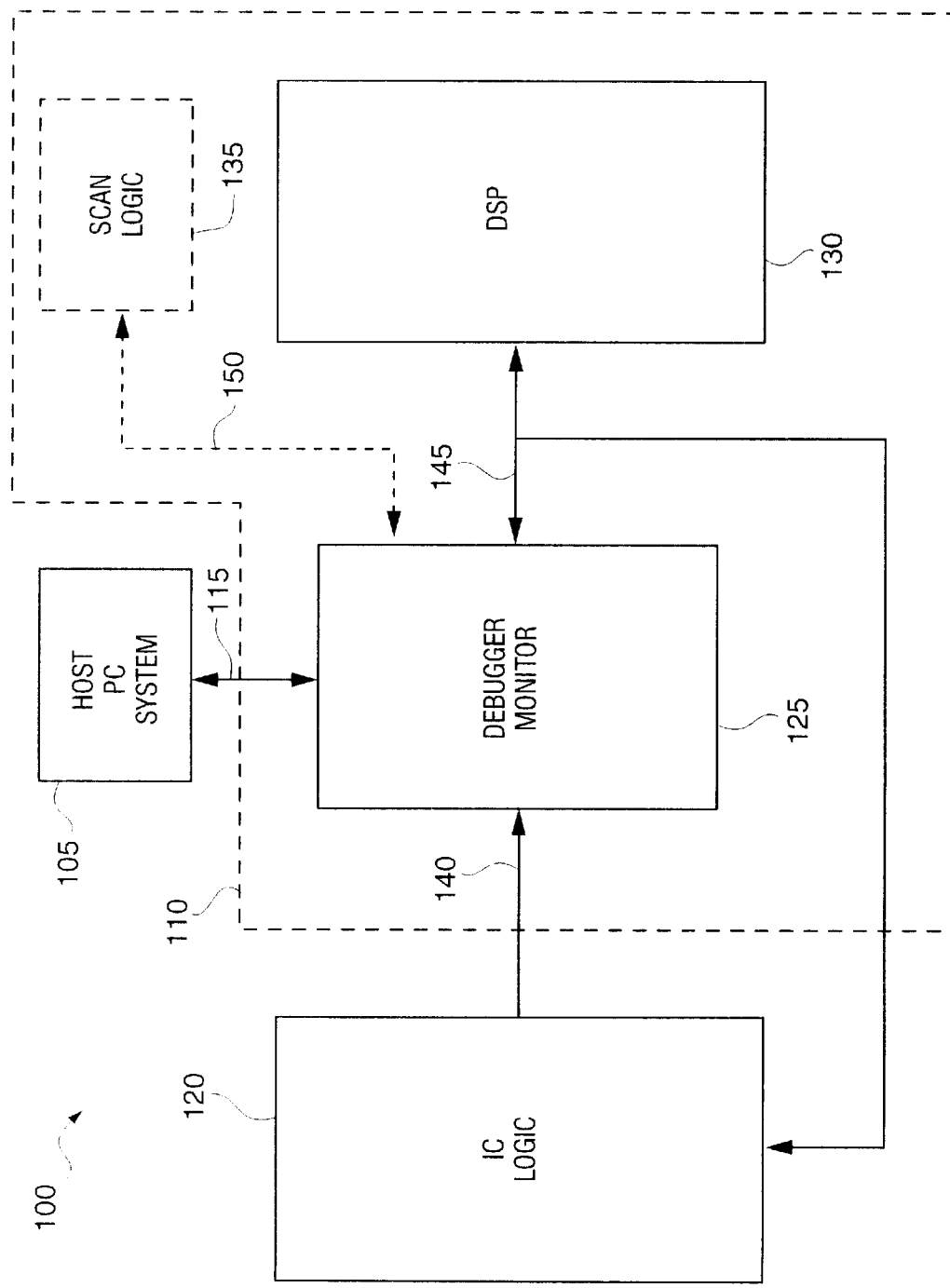
FIG. 1 is a block diagram of a testing system including a debugger/monitor according to the present invention.

While this invention is susceptible of embodiment in many different forms, there are shown in the drawings and will be described herein in detail specific embodiments thereof with the understanding that the present disclosure is to be considered as an exemplification of the principles of the invention and is not to be limited to the specific embodiments described.

Illustrated in FIG. 1 is a testing system 100 that includes a host computer system 105 coupled to an integrated circuit 110 via a lead 115. Included in integrated circuit 110 are a debugger monitor 125, a digital processor shown as a digital signal processor (DSP) 130, and combinatorial and sequential logic (not shown). Scan logic 135 is included as an option on integrated circuit 110, which preferably provides boundary scan testing capabilities.

DSP 130 is typically embedded within integrated circuit 110, for example SYM320C25-X2 DSP core available from Symbios Logic Inc. Other digital signal processors can be used without departing from the scope of the present invention, such as processors from the TMS320CXX family and all compatible processors thereto, or any other type of microprocessor. Debugger monitor 125 is coupled to the DSP 130 via lead 145 and scan logic 135 via a lead 150.

Integrated circuit 110 is coupled to external logic 120 via a lead 140 and lead 145. External logic 120 preferably includes memory and peripheral logic blocks, non-maskable interrupt stimulus logic, a peripheral wait state generator, and system reset stimulus logic.

Figure 2:
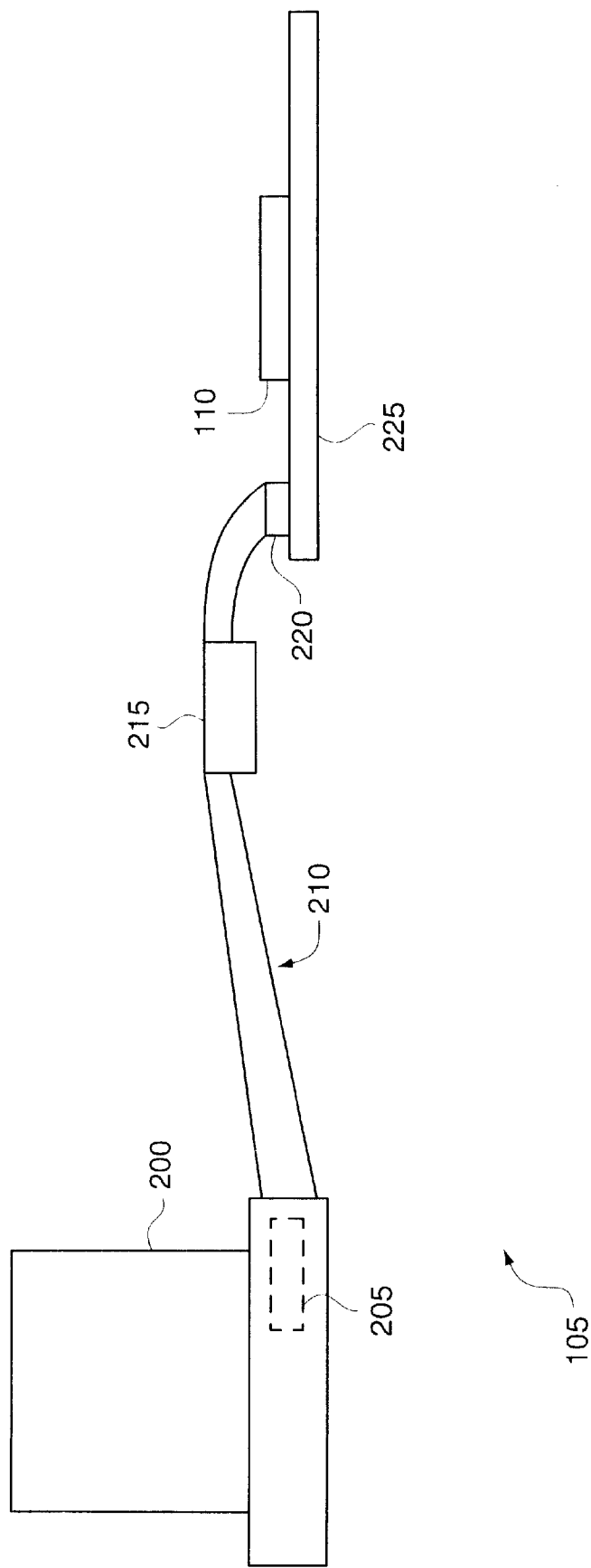
FIG. 2 is a diagram of the host computer system and integrated circuit of FIG. 1.

Referring to FIG. 2, host computer system 105 is shown in more detail. A host computer 200, preferably Intel 80X86 based or equivalent, includes a JTAG adapter card 205. Host computer 200 can also be a work station. The JTAG adapter card 205 preferably conforms to the JTAG IEEE Standard 1149.1, which is incorporated herein by reference. However, other serial protocols can be used. One end of a JTAG link cable 210 that preferably includes five leads and a buffer 215 is coupled to JTAG adapter card 205. The other end of JTAG link cable 210 is coupled to a tap 220 mounted on a printed circuit board 225. Also mounted on printed circuit board 225 is integrated circuit 110 and external logic 120 (not shown).

Figure 3:
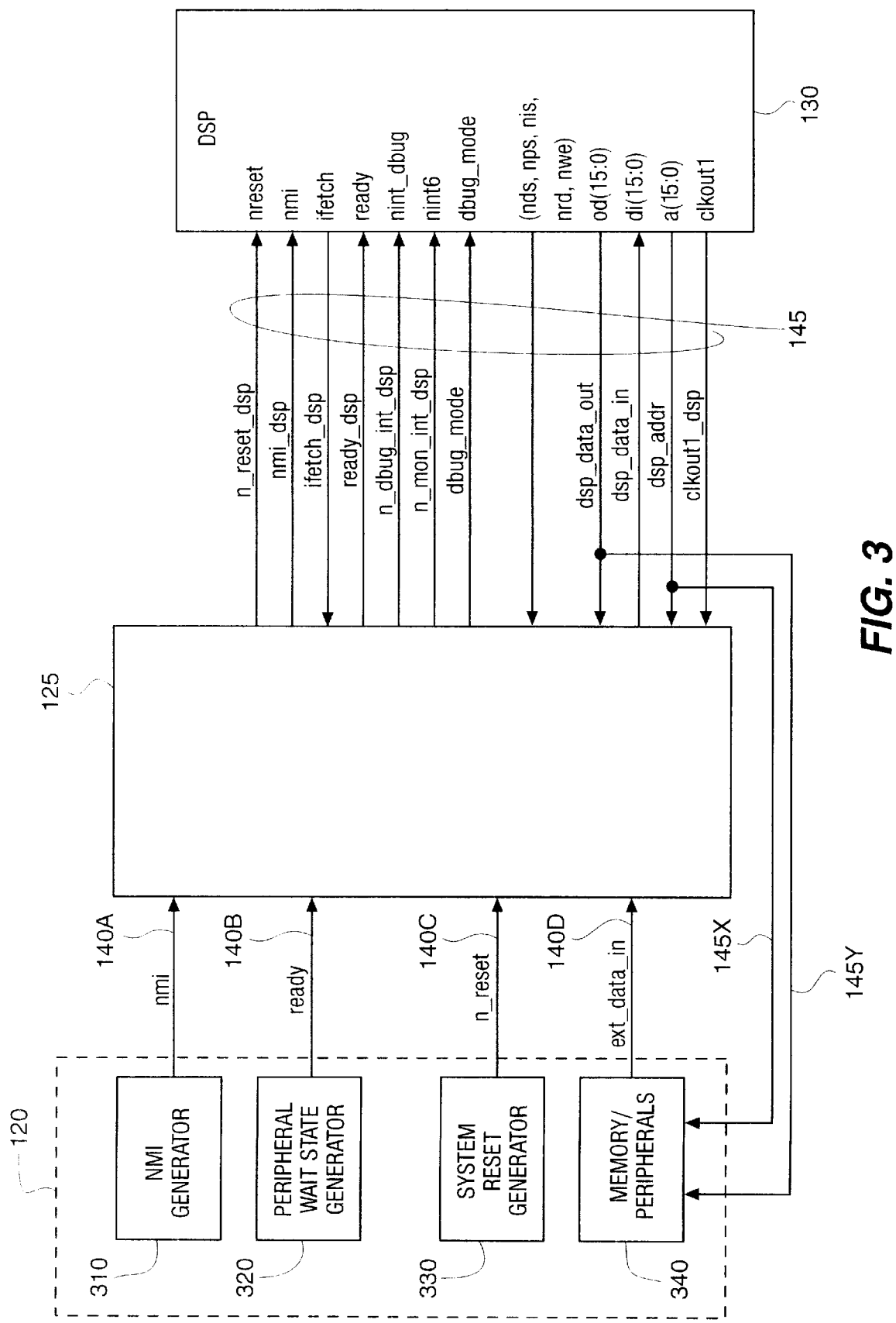
FIG. 3 is a block diagram of the circuit blocks included in the IC logic block along with the debugger monitor and DSP shown in FIG. 1.

Illustrated in FIG. 3 is external logic 120 in more detail. An NMI circuit 310 is included in external logic 120 that provides a non-maskable interrupt ("NMI") signal on lead 140a. Leads 140a–d are included in lead 140 shown in FIG. 1. The NMI signal is used when a peripheral circuit to DSP 130 encounters a "catastrophic" error. Such an error is of such importance, as determined by the system engineer, to warrant "non-maskable" status, i.e., it cannot be masked from DSP 130.

The NMI signal to DSP 130 is user maskable, from host computer system 105, to allow the user to selectively mask the NMI to DSP 130 as it may interfere with debugging operations. Therefore the NMI stimulus must be input to the debugger monitor 125 where it is gated with a NMI mask signal, and then driven to DSP 130.

A peripheral wait state generator 320 is also included in external logic 120 that generates a ready signal and is provided on lead 140b. The ready signal is used when a circuit cannot transmit or receive at the frequency of DSP 130. Maintaining the ready signal inactive injects a delay into the state sequencing of DSP 130. The ready signal is activated by peripheral wait state generator 320 to indicate to DSP 130 that to illustrate, data is available on a data bus or has been received from that bus.

A system reset generator 330 provides a system reset signal n_reset that is preferably active low on lead 140c. System reset signal n_reset is used to reset all circuitry contained in integrated circuit 110. A memory/peripherals block 340 provides an external data signal ext_data_in on lead 140d. External data signal ext_data_in provides data from a memory or other peripheral circuitry to DSP 130. Data and address from DSP 130 are provided to memory/peripheral block 340 via leads 145 x and y.

A debugger program provided by a user is communicated from host computer system 105 to DSP 130. The debugger program has two preferred modes: a virtual monitor mode and a resident monitor mode. The virtual monitor mode is a non-interruptable debugger mode where host computer system 105 has complete control of DSP 130. Host computer system 105 downloads all of the instructions which DSP 130 executes. All DSP 130 interrupts are automatically masked during this mode, except NMI which is selectively masked by the user through host computer system 105.

The resident monitor mode is an interruptable debugger mode where any selected unmasked DSP 130 interrupts can interrupt debugging operations. Debugger monitor 125 passes data between DSP 130 and host computer system 105 in this mode. Handshaking between DSP 130 and host computer system 105 is controlled by a program that preferably is linked with the user's code and is resident in target memory. This debugging program uses less memory of integrated circuit 110 than a typical monitor program.

Figure 4:
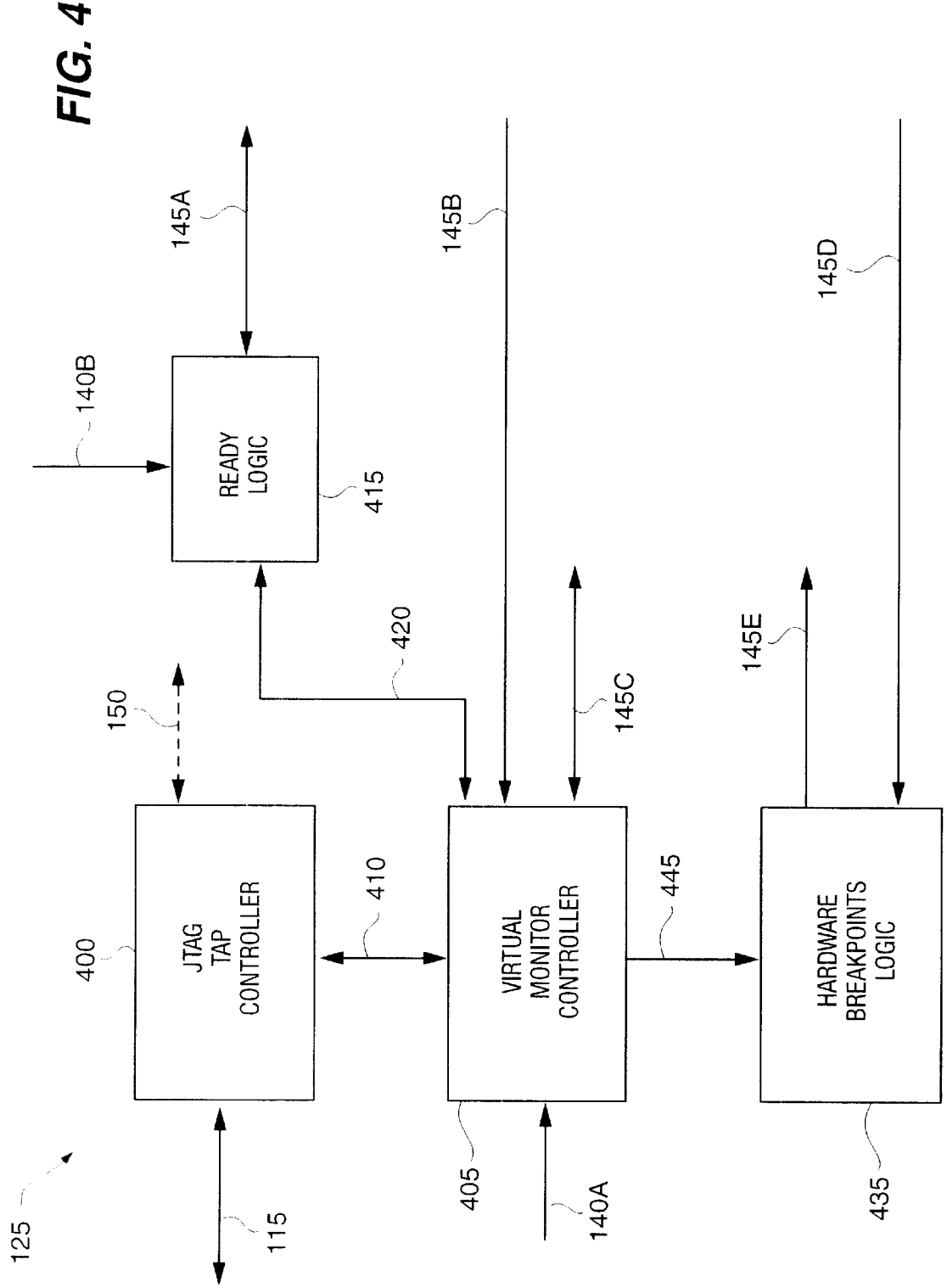
FIG. 4 is a block diagram of the circuitry included in the debugger/monitor of the present invention.

Turning to FIG. 4, debugger monitor 125 is shown in more detail. A JTAG tap controller 400, also preferably conforming to the JTAG IEEE Standard 1149.1, is coupled to tap 220 (FIG. 2) via lead 115. JTAG tap controller 400 is coupled to an virtual monitor controller 405 via a lead 410. JTAG tap controller 400 is coupled to scan logic 135 (FIG. 1) if provided via a lead 150.

Virtual monitor controller 405 is coupled to a ready logic 415 via a lead 420. Virtual monitor controller 405 is also coupled to DSP 130 (FIG. 1) via leads 145b and 145c, which are included in lead 145 shown in FIG. 1. Virtual monitor controller 405 is further coupled to NMI circuit 310 (FIG. 3) via lead 140a.

Ready logic 415 is coupled to DSP 130 via a lead 145a that is included in lead 145 shown in FIG. 1. Ready logic 415 is also coupled to peripheral wait state generator 320 (FIG. 3) via a lead 140b that is included in lead 140 shown in FIG. 1.

A hardware breakpoints logic 435 is coupled to virtual monitor controller 405 via a lead 445. DSP 130 is also coupled to hardware breakpoints logic 435 via leads 145d and 145e that are included in lead 145 of FIG. 1.

Figure 5:
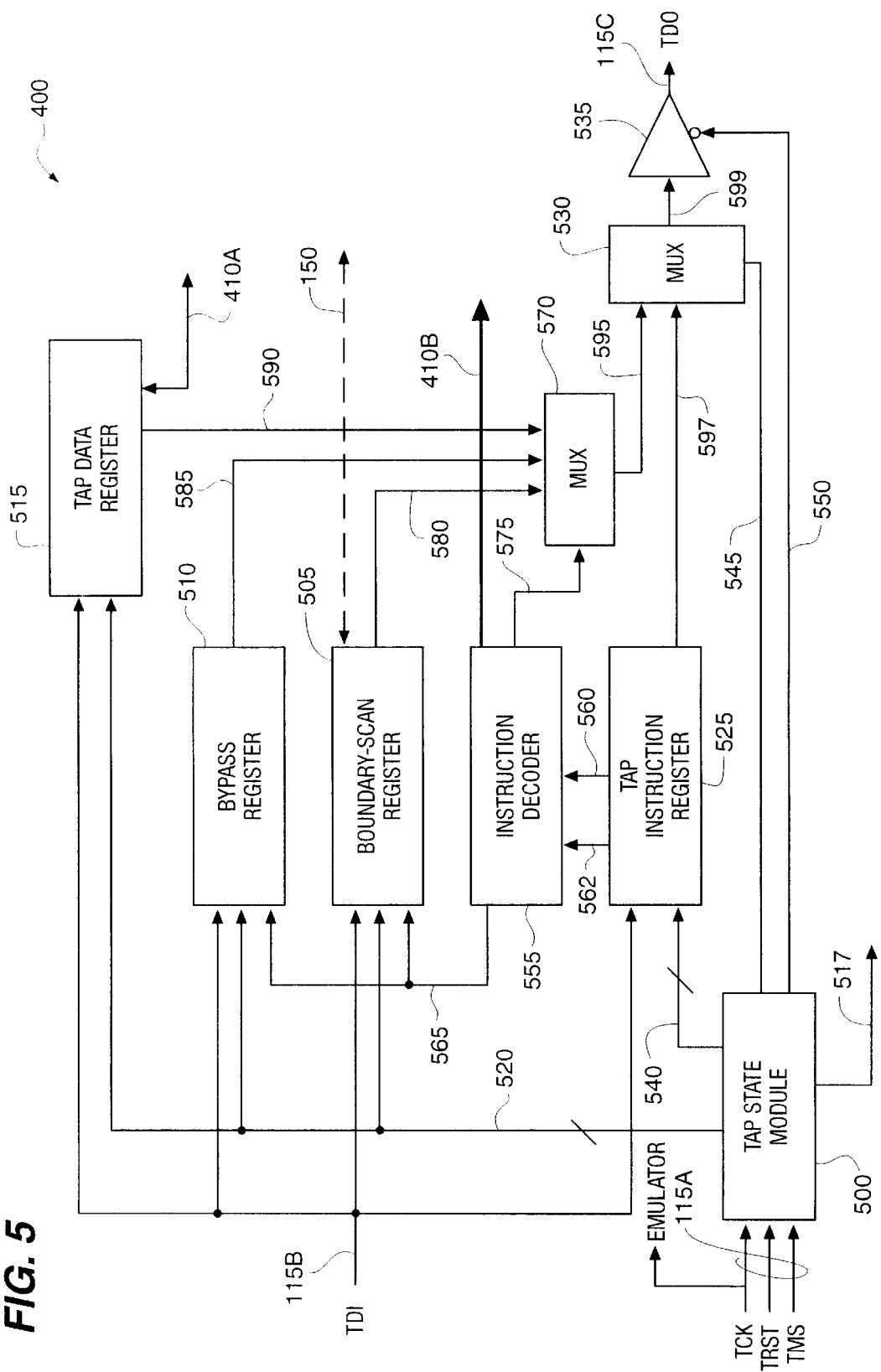
FIG. 5 is a block diagram of the JTAG TAP controller shown in FIG. 4.

Illustrated in FIG. 5 is JTAG tap controller 400. A tap state module 500 is coupled to host computer system 105 (FIG. 1) via lead 115a, which is included in lead 115 also shown in FIG. 1. Tap state module 500 is coupled to boundary-scan register 505, bypass register 510 and tap data register 515 via a lead 520. Tap state module 500 is also coupled to tap instruction register 525, multiplexor 530, and buffer 535 via leads 540, 545 and 550, respectively. Tap state module 500 provides a signal update_DR via a lead 517.

Instruction decoder 555 is coupled to tap instruction register 525 via leads 560 and 562, and provides an output over a lead 410b. Instruction decoder 555 is also coupled to bypass and boundary-scan registers 505, 510 via a lead 565. Bypass, boundary-scan and tap data registers 505, 510, 515 are coupled to host computer system 105 (FIG. 1) via a lead 115b that is included in lead 115 shown in FIG. 1.

A multiplexor 570 is coupled to instruction decoder 555 via a lead 575. Multiplexor 570 is coupled to bypass, boundary-scan and tap data registers 505, 510, 515 via respective leads 580, 585 and 590. Multiplexors 530, 570 are coupled together via a lead 595. Multiplexor 530 is coupled to tap instruction register 525 and buffer 535 via respective leads 597 and 599. Buffer 535 is coupled to host computer system 105 via a lead 115c that is included in lead 115 shown in FIG. 1.

Tap data register 515 is coupled to virtual monitor controller 405 via lead 410a. Lead 1410c is included in lead 410 shown in FIG. 4. Boundary-scan register 505 is coupled to scan logic 135 (FIG. 1) via a lead 150 if scan logic is provided. Otherwise, boundary-scan register may be configured to be inoperative or entirely removed.

JTAG tap controller 400 may also be used for scanning purposes if integrated circuit 110 implements any boundary or internal scan rings. JTAG tap controller 400 preferably provides all of the standard JTAG instruction decodes and control signals necessary for scanning. In particular, JTAG tap controller 400 provides all control signals necessary for integrated circuit 110 to contain up to four scan shift registers. JTAG tap controller also contains bypass register 510 that is necessary for JTAG scan operations.

JTAG tap controller 400 provides the communication interface between host computer system 105 and DSP 130 embedded in integrated circuit 110. The interface between host computer system 105 and debugger monitor 125 on integrated circuit 110 preferably is an I.E.E.E 1149.1 JTAG compatible interface. This interface preferably utilizes the following five signals: tck (tag clock) that may run up to 25 MHz; trst (jtag test mode reset); tms (jtag test mode select); tdi (jtag test data input); tdo (jtag test data output) and gnd (ground signal between host computer system 105 and printed circuit board 225 (FIG. 2). All these signals are provided on lead 115.

Tap data register 515 receives serially shifted data that is transferred to a register location in debugger monitor 125 specified by tap instruction register 525. Tap state module 500 includes a state machine defined by the I.E.E.E. specification 1149.1, which controls JTAG tap controller 400. While JTAG tap controller 400 is not used for scan chain testing, the command decodes and control signals for scan chain testing are provided.

Table 1 shows preferred valid instructions which are decoded from tap instruction register 525.

TABLE 1

Tap Instruction Register 525 Decodes.

| INSTRUCTION DECODED | INSTRUCTION VALUE | DESCRIPTION |
| --- | --- | --- |
| EXTEST | 0x00 | EXTEST as defined by I.E.E.E. 1149.1 |
| BYPASS | 0x1F | BYPASS as defined by I.E.E.E. 1149.1 |
| SAMPLE | 0x11 | SAMPLE as defined by I.E.E.E. 1149.1 |
| INTEST | 0x12 | INTEST as defined by I.E.E.E. 1149.1 |
| RUNBIST | 0x13 | RUNBIST as defined by I.E.E.E. 1149.1 |
| IDCODE | 0x14 | IDCODE as defined by I.E.E.E. 1149.1 |
| USERCODE | 0x15 | USERCODE as defined by I.E.E.E. 1149.1 |
| JTAG_IR_WRT | 0x02 | Write enabled to instruction register 700. |
| JTAG_IR_RD | 0x03 | Read enabled from instruction register 700. |
| JTAG_DR_WRT | 0x04 | Write enabled to data register 715. |
| JTAG_DR_RD | 0x05 | Read enabled from data register 715. |
| JTAG_MODE_WRT | 0x06 | Write enabled to mode register 735. |

TABLE 1-continued

Tap Instruction Register 525 Decodes.

| INSTRUCTION DECODED | INSTRUCTION VALUE | DESCRIPTION |
| --- | --- | --- |
| JTAG_MODE_RD | 0x07 | Read enabled from mode register 735. |
| JTAG_STAT_RD | 0x08 | Read enabled from status register 735. |
| JTAG_USER_1 | 0x09 | User defined decode 1. |
| JTAG_USER_2 | 0x0A | User defined decode 2. |
| JTAG_USER_3 | 0x0B | User defined decode 3. |
| JTAG_USER_4 | 0x0C | User defined decode 4. |

JTAG tap controller 400 includes a bypass register 510 as defined by the I.E.E.E. 1149.1 specification. JTAG tap controller 400 also provides MUX 530 to select the Test Data Out (TDO) from tap data register 515 as specified by tap instruction register 525.

Tap data register 515 preferably is a 16-bit serial shift register. Data being written from host computer system 105 via lead 115b is shifted into tap data register 515 prior to being loaded into the register of integrated circuit 110 specified by tap instruction register 525. Data being read by host computer system 105 is captured in tap data register 515 from the register specified by tap instruction register 525 via lead 410 and is then serially shifted to host computer system 105 via lead 115c.

Tap instruction register 525 preferably is a 5-bit serial shift register. Host computer system 105 downloads a JTAG command to tap instruction register 525 which is used to define and setup the data path for the next transfer of data from or to tap data register 515. The command decodes are defined above in Table 1.

Figure 6:
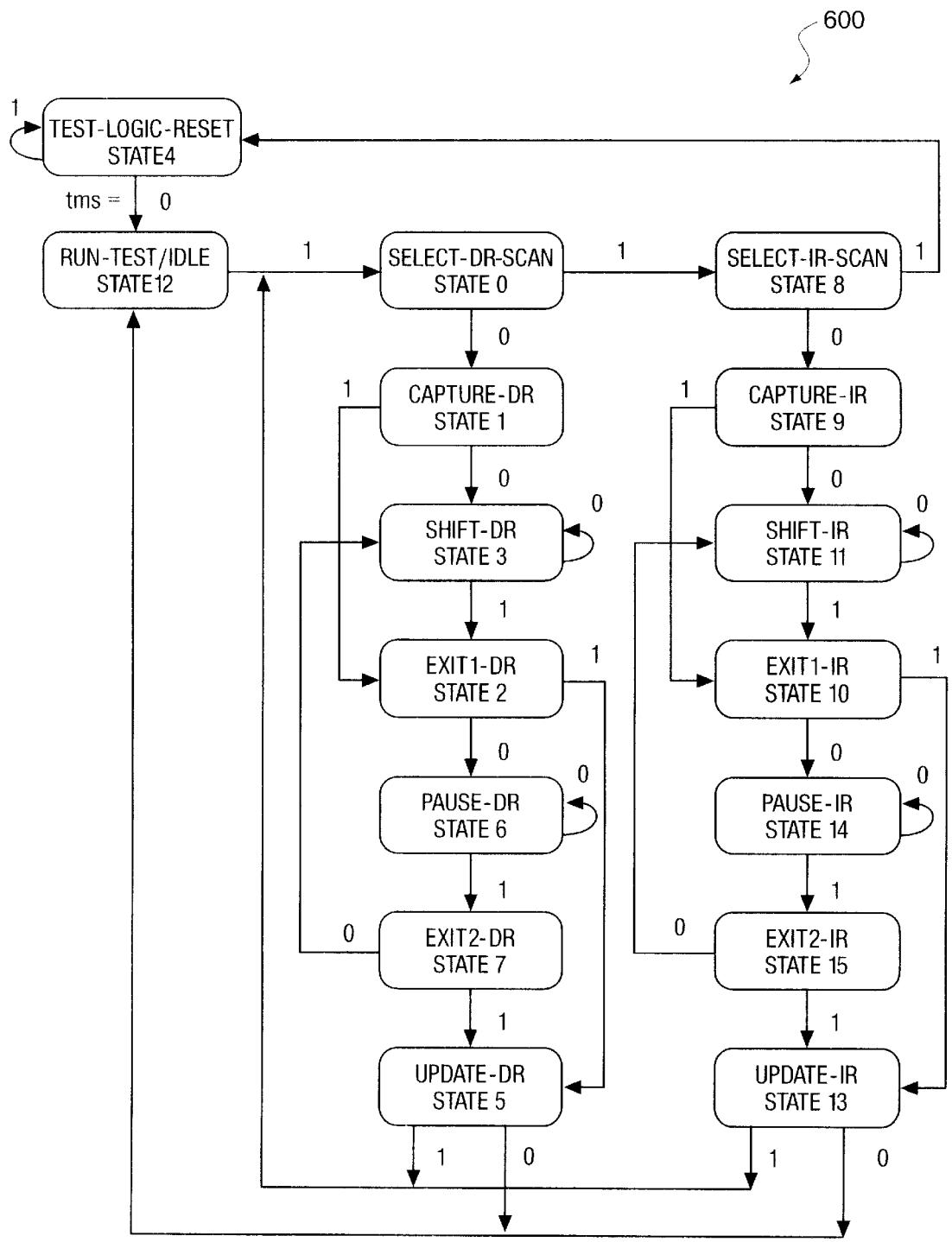
FIG. 6 is a state diagram for the tap controller shown in FIG. 5.

Tap state module 500 controls the data to be shifted into or out of tap data register 515 and tap instruction register 525. FIG. 6 presents a state diagram 600 for tap state module 500 shown in FIG. 5. State diagram 600 is the same as the standard JTAG tap controller state diagram of IEEE Standard 1149.1. Reference should be made to IEEE Standard 1149.1 for a more detailed explanation of the tap state module 500 operation.

Figure 7:
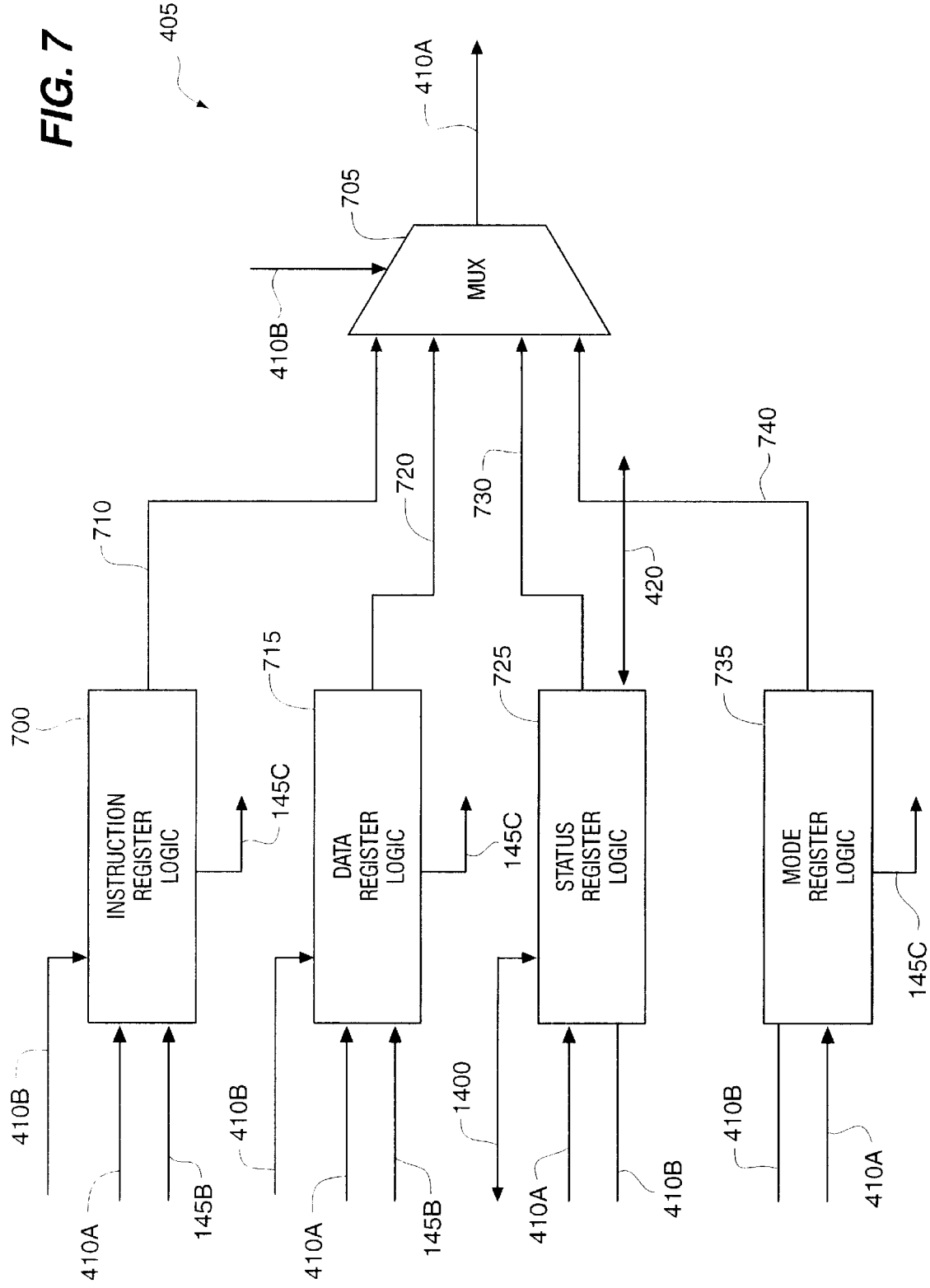
FIG. 7 is a block diagram of the virtual monitor controller shown in FIG. 4.

In FIG. 7, virtual monitor controller 405 is illustrated in more detail. An instruction register logic 700 is coupled to tap data register 515 (FIG. 5) via a lead 410a and to DSP 130 (FIG. 1) to receive an input via a lead 145b. Instruction register logic 700 is also coupled to provide an output to MUX 705 via a lead 710 and to DSP 130 via a lead 145c. A data register logic 715 is coupled to tap data register 515 (FIG. 5) via a lead 410a and to DSP 130 (FIG. 1) to receive an input via a lead 145b. Data register logic 715 is also coupled to MUX 705 via a lead 720 and to DSP 130 to provide an output via lead 145c.

A status register logic 725 is coupled to tap data register controller 515 (FIG. 5) via a lead 410a. Status register logic 725 is also coupled to ready logic 415 (FIG. 4) via lead 420 and to MUX 705 via a lead 730. A mode register logic 735 is coupled to tap data register 515 (FIG. 5) via a lead 410a. Mode register logic 735 is also coupled to DSP 130 to provide an output via lead 145c, and to MUX 705 via a lead 740.

Tap instruction register 525 controls MUX 705 via lead 410b, as well as logic 700, 715, 725 and 735. MUX 705 provides an output signal to tap data register 515 (FIG. 5) via lead 410a.

Virtual monitor controller 405 controls the flow of information between the JTAG Tap Controller 400 and DSP 130. Instruction and data register logic 700, 715 respectively hold instructions and data communicated between host computer system 105 and DSP 130. Mode and status register logic 725, 735 provide control and handshaking between host computer system 105 and DSP 130.

Figure 8:
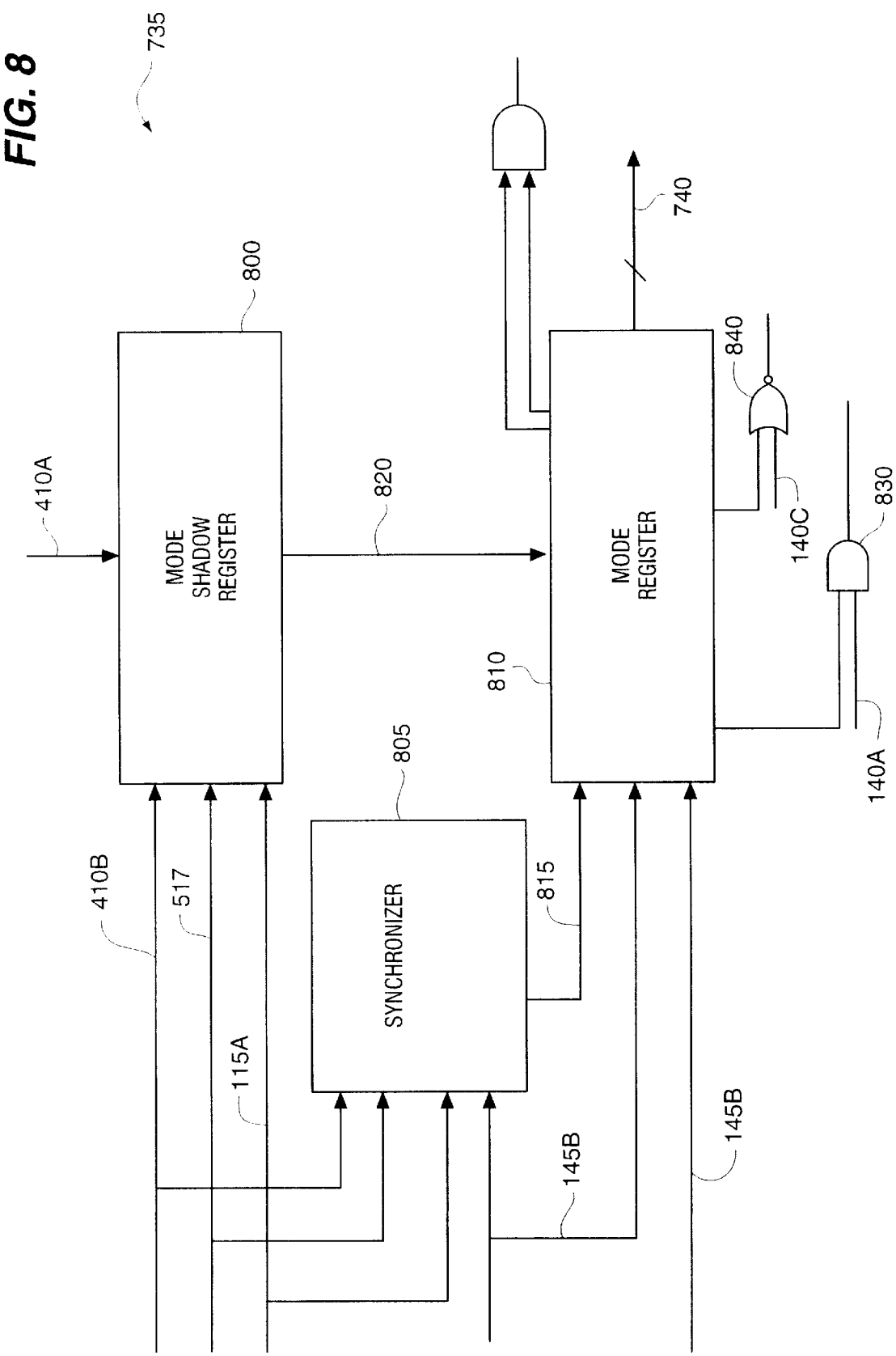
FIG. 8 is a block diagram of a mode register logic included in the virtual monitor controller shown in FIG. 7.

FIG. 8 is a detailed block diagram of mode register logic 735 shown in FIG. 7. A mode shadow register 800 is coupled to receive data from tap data register 515 (FIG. 5) via lead 410a. Mode shadow register 800 and a synchronizer 805 are coupled to JTAG tap controller 400 via leads 115a, 410b and 517. Synchronizer 805 and a mode register 810 are coupled to DSP 130 (FIG. 1) via a lead 145b to receive a clock signal clkout1. Mode register 810 is further coupled to synchronizer 805 via a lead 815 and to mode shadow register 800 via a lead 820. Mode register 810 receives a preferred reset signal from DSP 130 via lead 145b. Mode register 810 provides an output signal on lead 740 to MUX 705 (FIG. 7).

Mode register 810 preferably is a 9-bit register that is readable and writeable, via the JTAG tap controller 400, from host computer system 105 only. Mode register 810 is used by host computer system 105 to control the mode of debugger operations (i.e. debugger monitor 125 is in virtual or resident monitor mode). Mode register 810 is written synchronously with DSP 130 (preferably written at the falling edge of clkout1) since the output of mode register 810 is used by DSP 130. Mode shadow register 800 with synchronizer 805 are used to synchronize data in mode shadow register 810 to DSP 130. Mode register 810 preferably is set to 00 h with a chip reset (from system reset generator 330 of FIG. 3) or a reset issued from host computer system 105 via JTAG tap controller 400. Individual bits of Mode register 810 are defined below.

Bit 8 (dbug_mask_nmi) is set by the user to mask the non-maskable interrupt (nmi) to DSP 130. This allows the user to turn off the non-maskable interrupt during debugging to prevent a watchdog timer, or some other event, from affecting debugger operations. Preferably, the nmi signal is provided to debugger monitor 125 (FIG. 1), and not directly to DSP 130. NMI signal generated by NMI circuit 310 (FIG. 3) preferably is gated by AND gate 830 with the "dbug_mask_nmi" bit and then driven to DSP 130 as an nmi_dsp signal.

Bit 7 (virtual_mode_en), when active high, sets the virtual monitor mode active one cycle after DSP 130 does an instruction fetch from location hex 000E or 0026 (hardware or software interrupt addresses). Status register 725 "virtual_mode" bit is set active when this condition has occurred. Virtual_mode_en preferably is manually reset before the virtual monitor mode is exited, unless host computer system 105 intends to return to virtual monitor mode when a hardware breakpoint or software interrupt (SWI) is encountered.

Bit 6 (dbug_mode_rst), when active high, will cause the virtual monitor mode or the resident monitor mode to be exited after the completion of the current instruction fetch. This will allow host computer system 105 to download one final instruction, such as a "branch" or "return" instruction, before leaving either debugger mode. This bit is automatically reset when the debugger has been exited.

Bit 5 (dbug_rst_dsp) preferably is logically NORed with DSP 130 system reset signal n_reset (generated by system reset generator 330 of FIG. 3) such that, when both signals are set active, a n_reset_dsp signal to DSP 130 is set active low. The "dbug_rst_dsp" is then reset low to de-activate the n_reset_dsp signal to DSP 130. The system reset signal n_reset is wired to debugger monitor 125 where it is gated by NOR gate 840 with bit 5 and then driven to DSP 130.

Bit 4 (virtual_mode_int) is used in conjunction with the "dbug_mode_en" or virtual_mode_en bit to interrupt DSP 130 and initiate virtual monitor mode. Setting bit 4 active high causes a pulse to be generated and driven to the "nint_dbug" input of DSP 130. The pulse is a two clkout1 cycle wide pulse beginning at the rising edge of clkout1 and ending at the rising edge of clkout1 2 cycles later.

Bit 3 (resident_mode_int) when set causes an interrupt pulse to be driven to DSP 130. This interrupt pulse preferably is a two cycle wide clkout1 pulse beginning at the rising edge of clkout1 and ending at the rising edge of clkout1 2 cycles later. Resident_mode_int preferably is connected to the lowest priority interrupt of DSP 130. When resident_mode_int is serviced by DSP 130, the program preferably branches to the resident monitor code location.

Bits [2:0](ena_bp) select between several different modes of enabling hardware breakpoint logic 435 (FIG. 4) as shown in Table 2 below.

TABLE 2

Breakpoint Hardware Logic 435 Enables.

| ena_bp[2:0] | Breakpoint Description |
| --- | --- |
| 7 | Breakpoints disabled |
| 6 | Enables an interrupt at Breakpoint 1 only |
| 5 | Enables an interrupt at Breakpoint 0 only |
| 4 | Enables Breakpoint 1 "OR" Breakpoint 0 |
| 3 | Enables an interrupt at Breakpoint 1 "AND" Breakpoint 0 |
| 2 | Enables an interrupt at Breakpoint 1 followed by Breakpoint 0 |
| 1 | Enables an interrupt at Breakpoint 0 followed by Breakpoint 1 |
| 0 | Breakpoints disabled |

Figure 9:
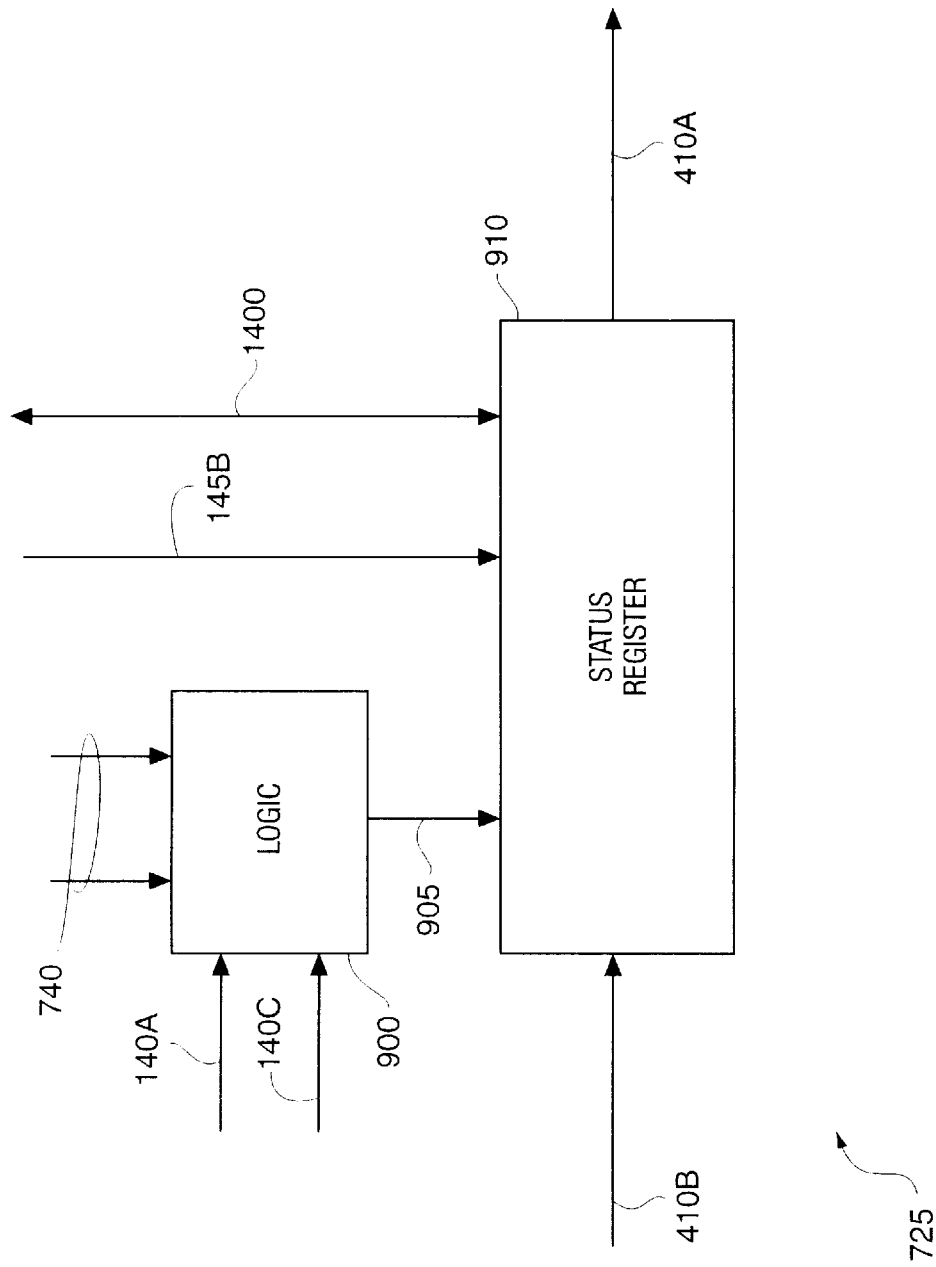
FIG. 9 is a block diagram of a status register logic included in the virtual monitor controller shown in FIG. 7.

FIG. 9 is a detailed block diagram of status register 725 shown in FIG. 7. Logic 900 is coupled to mode register 810 (FIG. 8) via lead 740, to NMI circuit 310 (FIG. 3) via lead 140a and system reset generator 330 (FIG. 3) via lead 140c. Logic 900 outputs a virtual_mode_set signal to status register 10 via a lead 905.

Status register 910 is coupled to DSP 130 (FIG. 1) via lead 145b and to ready logic 415 (FIG. 4) via lead 145a. Status register 910 receives an enable signal from instruction decoder 555 (FIG. 5) via lead 410b. Status register 910 outputs a signal to tap data register 515 (FIG. 5) via lead 410a.

Status register 910 preferably is a memory mapped register, located at hex 004E, used to pass debugger status between the host computer system 105 and DSP 130. Status register 910 is set to 00 h in response to a trst signal. All 5 bits in this register are set synchronously with clkout1 of DSP 130 and will therefore need to be synchronized with the JTAG tck_clk before being read by host computer system 105.

Bit 4 (virtual_mode) is set by logic 900 via lead 905 when virtual monitor mode has been entered and will remain set until the debugger is exited. During virtual monitor mode, all of the interrupts to DSP 130 remain masked. However, if a non-maskable interrupt, or a reset should occur, virtual_mode will be reset. This reset indicates to host computer system 105 that the debugger has been abnormally terminated. Virtual_mode is automatically reset when the debugger is exited.

Bit 3 (resident_mode) is written by DSP 130 from the resident monitor code. An active resident_mode signal indicates to host computer system 105 that the debugger is active and in resident monitor mode. The resident monitor mode is interruptable, however, if a non-maskable interrupt or a reset occurs. In this event, resident_mode will be reset, which indicates to host computer system 105 that the debugger has been abnormally terminated. Resident_mode is automatically reset when the debugger is exited.

Bit 2 (dsp_data_rdy) is a signal to host computer system 105 that data has been written to tap data register 515 by DSP 130 and is ready for host computer system 105 to read it. Dsp_data_rdy is set following a DSP 130 write to tap data register 515 while the "virtual_mode" or "resident_mode" bits are active. Dsp_data_rdy is reset after the host has read tap data register 515.

Bit 1 (host_data_rdy) is a signal for resident monitor mode that data has been written to tap data register 515 from host computer system 105 and is ready for DSP 130 to read it. Host_data_rdy is set following host computer system 105 write to tap data register 515 while the "virtual_mode" or "resident_mode" bits are active. Host_data_rdy is reset after DSP 130 has read tap data register 515.

Bit 0 (dsp_rdy) indicates to host computer system 105 that DSP 130 is waiting for an instruction to be downloaded to tap instruction register 525. Dsp_rdy is set when DSP 130 performs an instruction fetch while "dbug_mode" is active, and is then reset following host computer system 105 write to tap instruction register 525.

Figure 10:
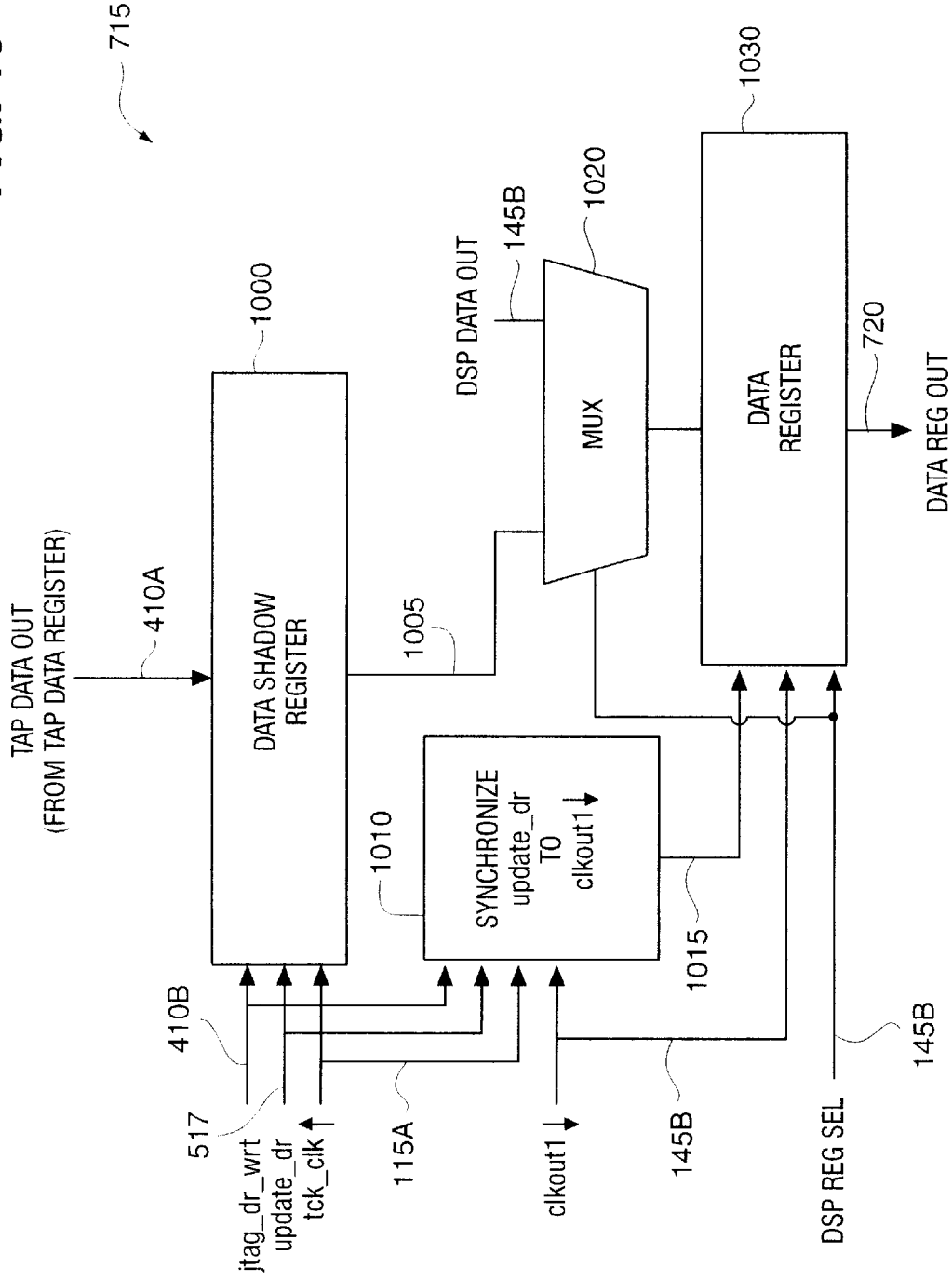
FIG. 10 is a block diagram of a data register logic included in the virtual monitor controller shown in FIG. 7.

FIG. 10 is a detailed block diagram of data register logic 715 shown in FIG. 7. A data shadow register 1000 is coupled to data tap register 515 (FIG. 5) via a lead 410a. Data shadow register 1000 and a synchronizer 1010 are coupled to JTAG tap controller 400 via leads 115a, 410b and 517. Synchronizer 1010 and a MUX 1020 are coupled to DSP 130 (FIG. 1) via leads 145b. MUX 1020 is coupled to data shadow register 1000 via a lead 1005. A data register 1030 is further coupled to synchronizer 1010 via a lead 1015. Data register 1030 is coupled to MUX 1020 via a lead 1025. Data register 1030 provides an output signal on lead 720 to MUX 705 (FIG. 7).

Data register 1030 preferably is a 16-bit register located in "data" space at 004Fh. This register is readable and writeable by both host computer system 105, via JTAG tap controller 400, and DSP 130. Data register 1030 operates synchronously to DSP 130. Since host computer system 105 and DSP 130 operate asynchronously, data written from host computer system 105 is preferably held in data shadow register 1000 until the data write operation is synchronized with data register 1030. Data shadow register 1000 is referred so host computer system 105 can read or write to another register without overwriting the data waiting to be synchronously loaded into data register 1030. Data register 1030 preferably is set to 00 h with either a chip reset or a reset issued from host computer system 105 via JTAG tap controller 400.

Figure 11:
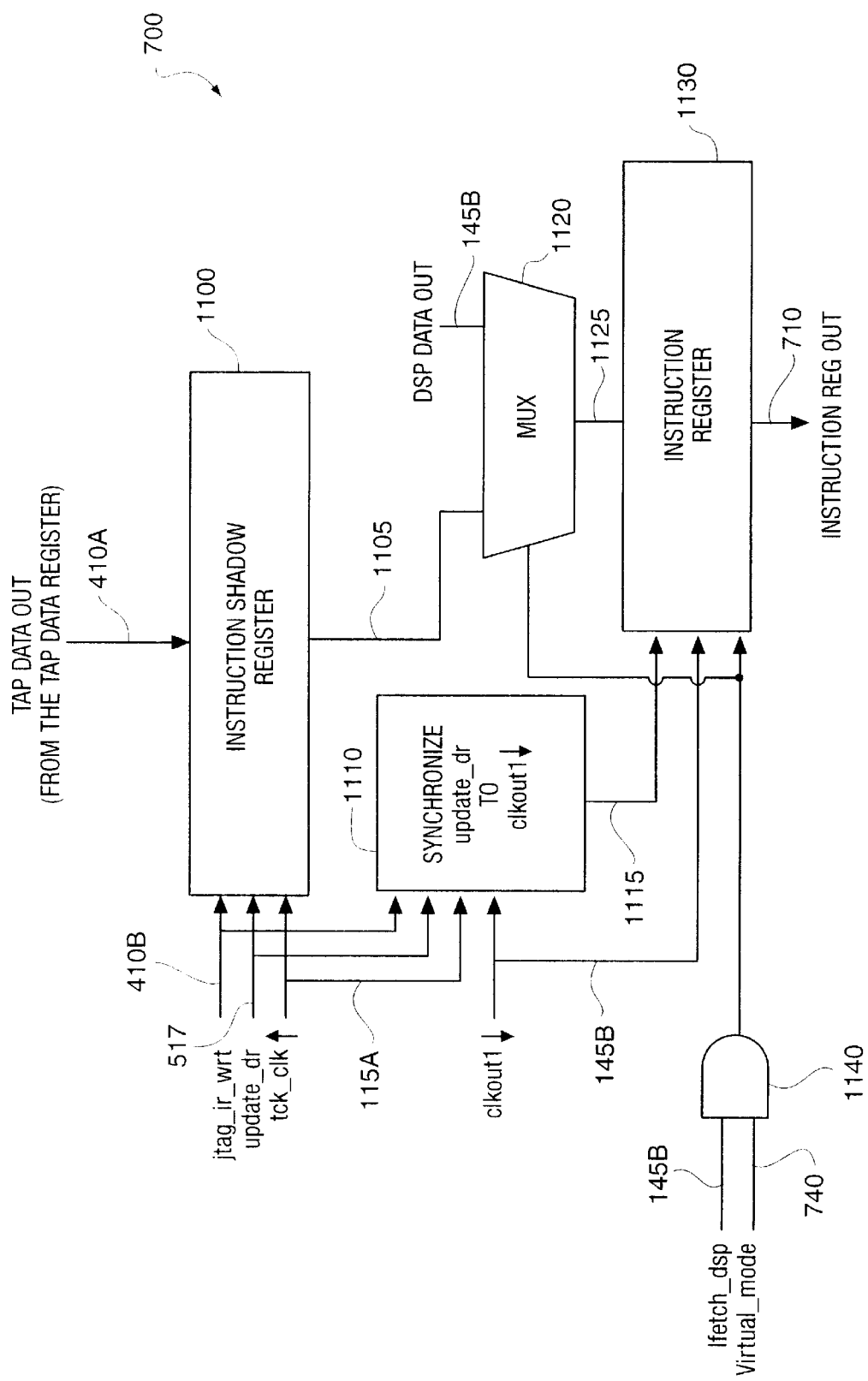
FIG. 11 is a block diagram of an instruction register logic included in the virtual monitor controller shown in FIG. 7.

FIG. 11 is a detailed block diagram of instruction register logic 700 shown in FIG. 7. An instruction shadow register 1100 is coupled to tap data register 515 (FIG. 5) via a lead 410a. Instruction shadow register 1100 and a synchronizer 1110 are coupled to JTAG tap controller 400 via leads 115a, 410b and 517. Synchronizer 1110 and a MUX 1120 are coupled to DSP 130 (FIG. 1) via leads 145b. MUX 1120 is coupled to instruction shadow register 1100 via a lead 1105. An instruction register 1130 is further coupled to synchronizer 1110 via a lead 1115 and is coupled to MUX 1120 via a lead 1125. Instruction register 1030 provides an output signal on lead 710 to MUX 705 (FIG. 7). An AND gate 1140 is coupled to instruction register 1130 via a lead 1145. AND gate 1140 is coupled to DSP 130 via lead 145b and mode register 810 (FIG. 8) via lead 740.

Instruction register 1130 preferably is a 16-bit memory-mapped register located in "program" space at 000Fh. Instruction register 1030 is readable and writeable by both host computer system 105, via JTAG tap controller 400, and DSP 130. Instruction register 1130 operates synchronously to DSP 130. Since host computer system 105 and DSP 130 operate asynchronously, data written from host computer system 105 is preferably held in instruction shadow register 1100 until the write operation can be synchronized with instruction register 1130. Instruction shadow register 1100 is preferred so host computer system 105 can read or write another register without overwriting the data waiting to be synchronously loaded into instruction register 1130. Instruction register 1130 is set to 00 h with either a chip reset or a reset issued from host computer system 105 via JTAG tap controller 400.

The output of data register is not re-synchronized to the tck_clk and therefore, is valid only when the "dsp_data_rdy" bit is set in the status register 910.

Instruction register 1130 and mode register 810 are not re-synchronized to the tck_clk and preferably are not to be read by host computer system 105. A read command is supported for the these registers, however, for testing and diagnostic purposes. The user must be carefull to only read these registers when their respective outputs are valid.

The Status Register, which is polled continually by host computer system 105, is re-synchronized to the tck_clk and, therefore, can be read at any time.

Figure 12:
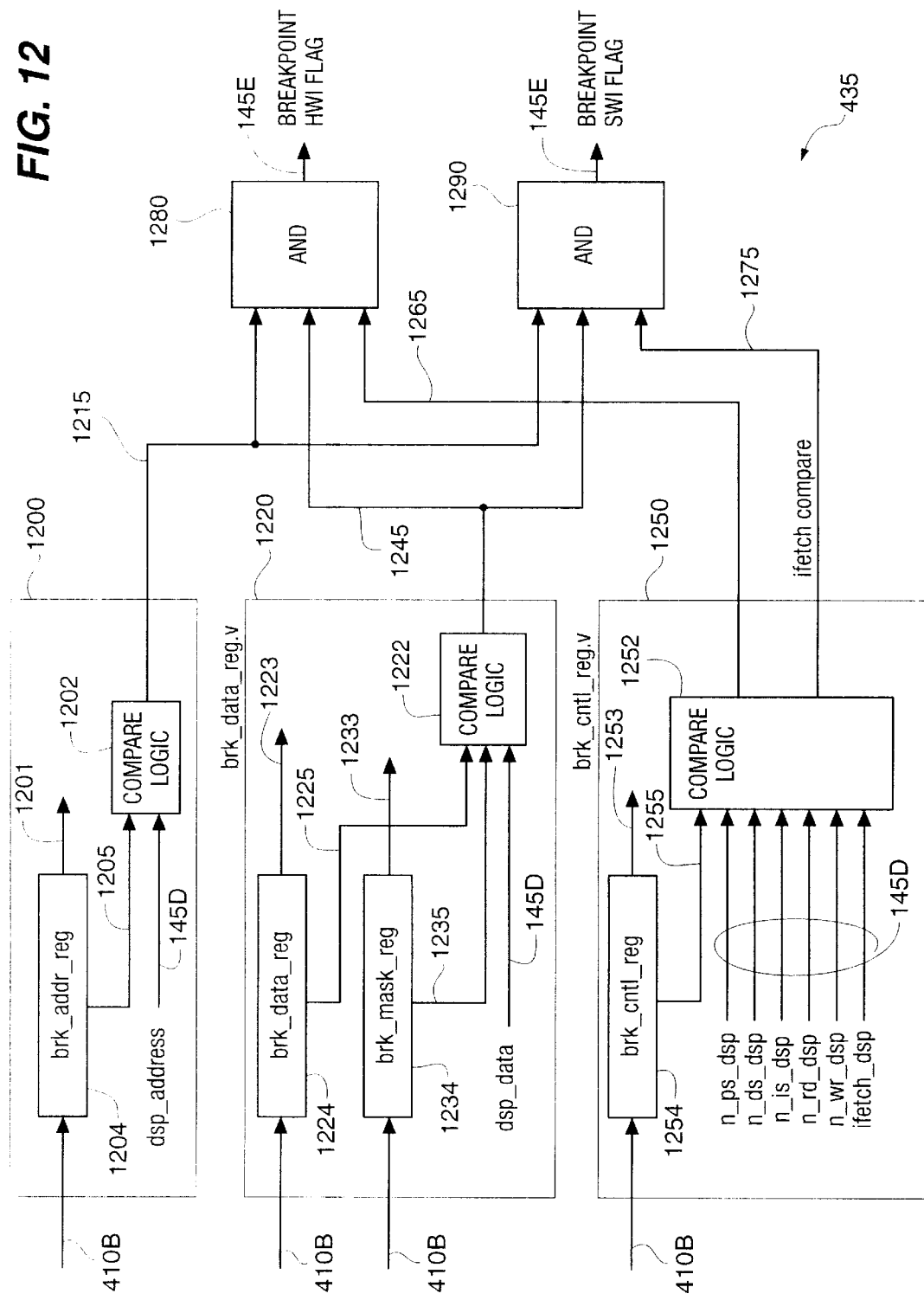
FIG. 12 is a block diagram of a hardware breakpoint register included in the hardware breakpoints logic shown in FIG. 4.

FIG. 12 is a more detailed block diagram of hardware breakpoints logic 435 depicted in FIG. 4. Hardware breakpoints logic 435 includes breakpoint address logic 1200, breakpoint data logic 1220, breakpoint control logic 1250, and AND gates 1280, 1290. AND gates 1280, 1290 provide outputs on respective lead 145e.

Breakpoint address logic 1200 includes compare logic 1202 coupled to breakpoint address register 1204 via a lead 1205. DSP 130 is coupled to compare logic 1202 via lead 145b. Breakpoint address register 1204 is coupled to JTAG tap controller 400 via lead 410d. Compare logic 1202 is coupled to AND gates 1280, 1290 via a lead 1215.

Breakpoint data logic 1220 includes compare logic 1222 coupled to breakpoint data and breakpoint mask registers 1224, 1234 via respective leads 1225 and 1235. Compare logic 1222 is coupled to DSP 130 via lead 145b. Breakpoint data and breakpoint mask registers 1224, 1234 are coupled to JTAG tap controller via lead 145d. Compare logic 1222 is coupled to AND gates 1280, 1290 via a lead 1245.

Breakpoint control logic 1250 includes compare logic 1252 coupled to a breakpoint control register 1254 via a lead 1255. Compare logic 1252 is coupled to DSP 130 via lead 145b. Breakpoint control register 1254 is coupled to JTAG tap controller 400 via lead 410d. Registers 1204, 224, 1234 and 1254 operate synchronously to DSP 130 and are preferably read and written only through DSP 130.

Two hardware breakpoints are associated with debugger monitor 125. The user via host computer system 105 may set a specific DSP 130 state (address, data, and control signals) into registers 1210, 1230 and 1250, then exit the debugger and allow DSP 130 to continue operation. When the state specified by registers 1210, 1230 or 1250 is encountered, DSP 130 will be interrupted and the debugger mode will be activated.

Preferably, the present invention includes two hardware breakpoints logic 435. Each generate two flags: a breakpoint hardware interrupt flag on lead 145e and a breakpoint software interrupt flag on lead 145e. The hardware breakpoint interrupt logic 435 monitor status of the breakpoint flags received from registers 1204, 1224, 1234, 1254. Based on the value of mode register 810 bits [2:0], a breakpoint hardware interrupt flag will cause a 2 clkout1 cycle wide interrupt pulse ("nint_dbug") to be driven to DSP 130. A breakpoint software interrupt flag will select either the swi_reg or the trap_reg, depending on the debugger mode.

Hardware breakpoints logic 435 preferably is enabled while virtual monitor mode is inactive. Otherwise, the program counter value of DSP 130 is not accurate during virtual monitor mode.

Breakpoint address register 1204 preferably is a 16-bit DSP memory mapped register. The user stores a DSP address breakpoint value at this location which is then compared with dsp_address signal provided by 145b. When this comparison is true and the comparisons from the breakpoint data register 1229 and the breakpoint control register are true, a breakpoint flag will be generated by AND gate 1280.

Breakpoint data logic 1220 consists of a comparator 1222 and two 16-bit DSP memory mapped registers 1224, 1234. Breakpoint data register 1224 stores a DSP data breakpoint value, and breakpoint mask register 1234 is programmed to mask any or all the bits in breakpoint data register 1224. A logic 1 in any last position of breakpoint mask register 1234 causes the comparison of the corresponding bit of breakpoint data register 1224 to be true. Unmasked breakpoint data register 1224 bits are then compared with the dsp_data_bus value. When this comparison is true, and the comparisons from the breakpoint address logic 1200 and the breakpoint control logic 1250 are true, a breakpoint flag will be generated by AND gate 1280.

Breakpoint control register 1254 preferably is a 6-bit DSP memory mapped register. The user stores a desired DSP control breakpoint criteria at this location which is then compared with the corresponding DSP control signals. When this comparison is true, and the comparisons from the breakpoint address logic 1200 and the breakpoint data logic 1220 are true, a breakpoint flag will be generated by AND gate 1280. Listed below are the individual bits of breakpoint control register 1254.

Bit 5: brkp_ps. When this bit is set, comparator 1252 will check for an access to program space, which is signaled by n_ps_dsp is low.

Bit 4: brkp_ds. When this bit is set, comparator 1252 will check for an access to data space, which is signaled by n_ds_dsp low.

Bit 3: brkp_is. When this bit is set, comparator 1252 will check for an access to I/O space, which is signaled by n_is_dsp low.

Bit 2: brkp_rd. This bit may be set in conjunction with bits 3, 4, or 5 to check for a READ access to program, data or I/O space. Comparator 1252 checks for n_rd_dsp to be low.

Bit 1: brkp_wr. This bit may be set in conjunction with bits 3,4, or 5 to check for a WRITE access to program, data or I/O space. Comparator 1252 checks for n_wr_dsp to be low.

Bit 0: brkp_ifetch. When this bit is set, comparator 1252 checks for an active instruction fetch ifetch_dsp. All the other bits in this register are ignored.

To summarize, the breakpoint hardware interrupt flag is generated whenever both breakpoint address and breakpoint data registers 1204, 1224 are equal to the dsp_address and dsp_data_busses respectively, and bits 5 through 1 of the breakpoint control register 1254 are equal to their respective control signals. When the breakpoint address and breakpoint data registers 1204, 1224 are equal to the dsp_address and dsp_data_busses respectively, and bit 0 (brkp_ifetch) of breakpoint control register 1254 is set, a breakpoint software interrupt flag is generated by AND gate 1290 during an instruction fetch.

Figure 13:
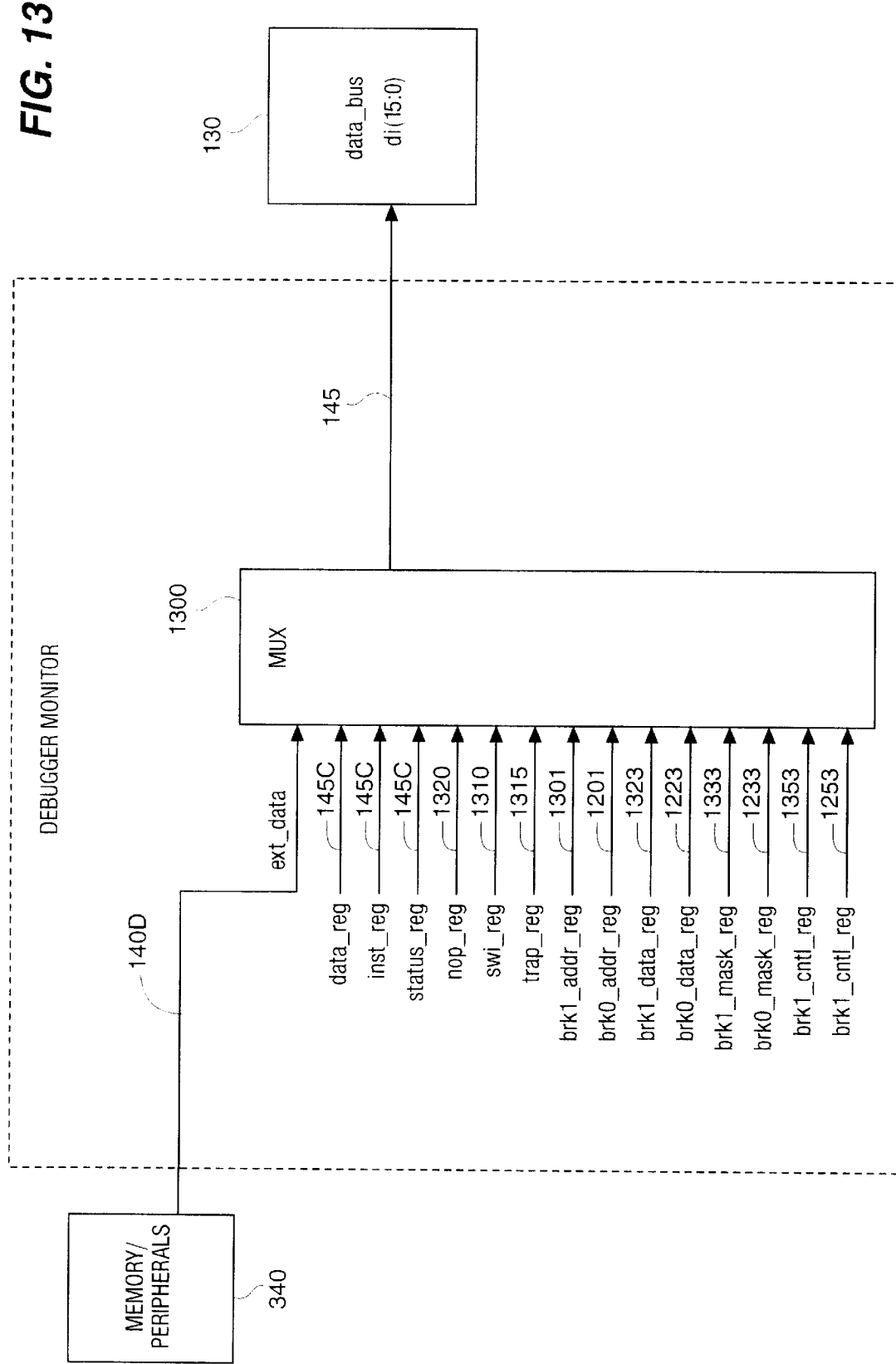
FIG. 13 is a block diagram of the multiplexor shown in FIG. 4.

Debugger monitor 125 preferably is coupled to a data input bus "di (15:0)" of DSP 130 (FIG. 3), and is disposed between DSP 130 and IC logic 120. Therefore, a multiplexor is utilized for data being read by or sent to DSP 130. Referring to FIG. 13, a MUX 1300 is shown as being included in debugger monitor 125. As illustrated, MUX 1300 is disposed between memory peripherals 340 and DSP 130.

MUX 1300 selects data_reg input on lead 145c whenever DSP 130 addresses data register 1030 (FIG. 10). Inst_reg input on lead 145c is selected anytime DSP 130 addresses the instruction register 1130. Likewise, inputs on leads 145c, 1201, 1223, 1233 and 1253 provided from the status register 910 and breakpoint registers 1204, 1224, 1234 and 1254 are selected whenever DSP 130 places the corresponding address on the dsp_address bus (FIG. 3). Leads 1301, 1323, 1333 and 1353 are coupled to the send breakpoint logic.

A swi_reg input on lead 1310 is selected whenever an instruction fetch breakpoint has occurred provided by AND gate 1290 (FIG. 12), and "virtual_mode_en" is set in mode register 810 (FIG. 8). The swi_reg input preferably is not provided from a writeable register, but a location with a hardcoded SWI instruction. The instruction is placed onto DSP 130 data_bus di (15:0) in place of the addressed instruction to cause an interrupt when it is executed.

A trap_reg input is selected whenever an instruction fetch breakpoint has occurred provided by AND gate 1280 in FIG. 12, and "virtual_mode_en" is not set inactive in the mode register. The trap_reg input preferably is not provided from a writeable register, but a location with a hardcoded TRAP instruction. The TRAP instruction is placed onto DSP 130 data_bus di (15:0) in place of the addressed instruction to cause an interrupt when it is executed.

During virtual monitor mode, all instruction fetches by DSP 130 preferably are read from instruction register 1130 (FIG. 11) regardless of what device DSP 130 is addressing. The address bus of DSP 130 is ignored and the contents of instruction register 1130 are placed onto the data_bus for DSP 130. This preferably only occurs when in virtual monitor mode (status register 910 "virtual_mode" bit is set) and DSP 130 is performing an instruction fetch (the "ifetch_dsp" signal is active). All other DSP 130 memory accesses occur normally.

During non-debugger operations, a nop_reg input on lead 1320 from a NOP register is selected whenever DSP 130 addresses predetermined locations and mode register 810 "virtual_mode_en" bit is set. The NOP register preferably is not a physical register, but a hardcoded NOP value. The NOP register is also selected whenever mode register 810 "virtual_mode_en" bit is set along with "dbug_rst_dsp" and status register 910 "virtual_mode" bit is not set. The NOP register remains selected until DSP 130 addresses another predetermined location, at which time the virtual monitor mode is started and status register 910 "virtual_mode" bit is set. This condition occurs when starting the debugger from reset using mode register 810 "dbug__rst__dsp" and "dbug__mode__en" bits.

Figure 14:
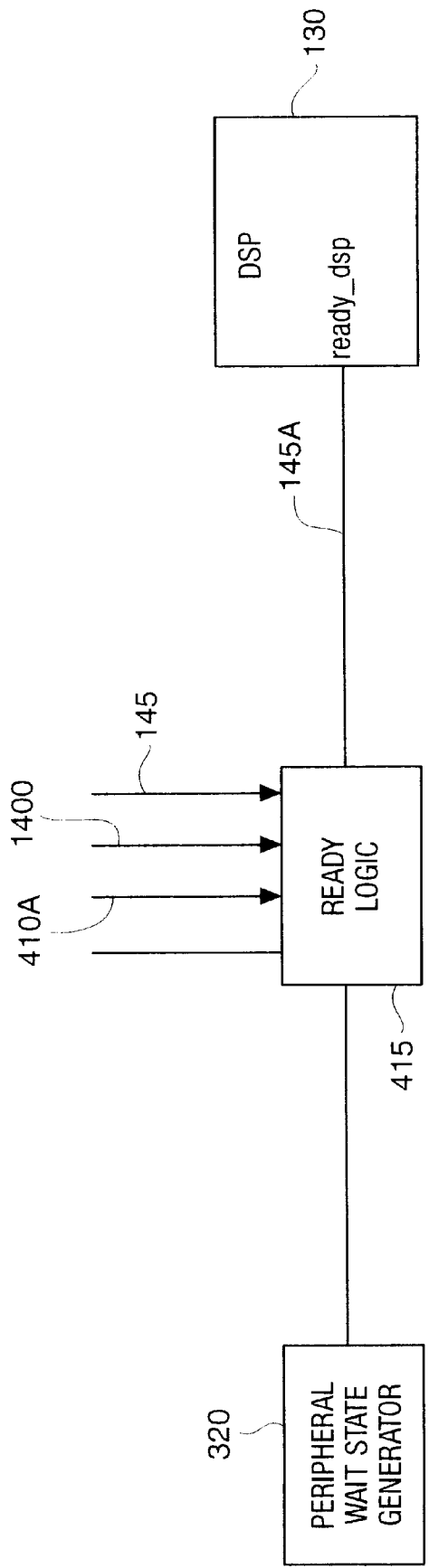
FIG. 14 is a block diagram of the ready logic shown in FIG. 4.

FIG. 14 illustrates the preferred connections of ready logic 45 shown in FIG. 4. The "ready" signal to the processor is controlled by emulator controller 405 (FIG. 4) since wait states will need to be inserted to hold DSP 130 while downloading an instruction from host computer system 105.

While in the virtual monitor mode emulator controller 405 controls the data__bus of DSP 130 during instruction fetches. The program space currently addressed by the value of the prefetch counter on address bus of DSP 130 is ignored and the value of instruction register 1130 is multiplexed onto the data__bus.

A ready signal input to DSP 130 preferably is controlled from debugger monitor 105. During virtual monitor mode, the ready signal needs to be negated while waiting for host computer system 105 to download an instruction or upload data. Otherwise, the ready signal is controlled from peripheral wait state generator 320 (FIG. 3). The sequence for downloading an instruction and controlling the "ready__dsp" signal is as follows:

1) DSP 130 attempts an instruction fetch. Ready logic 415 must de-activate the ready__dsp signal and then set the "dsp__rdy" bit of status register 910.

2) Host computer system 105 polls status register 910 until a set "dsp__rdy" bit is read. Then, host computer system 105 downloads data to data register 1030, if applicable, and downloads an instruction to instruction register 1130.

3) The "dsp__rdy" bit is automatically reset following the write to instruction register 1130 and then the ready__dsp signal is re-activated.

4) When DSP 130 detects that ready__dsp is active, DSP 130 completes the instruction fetch and performs the operation. Since "virtual__mode" is active, the dsp__address bus is ignored and MUX 1300 channels instruction register (inst__reg) onto the dsp__data__bus during the instruction fetch cycle.

5) After the instruction is executed, DSP 130 will attempt another instruction fetch and the cycle will begin again. However, if the result of the instruction previously executed placed data in data register 1030 for host computer system 105 to read, then the "dsp__data__rdy" bit in status register 910 is set when DSP 130 writes data into data register 1030. Ready__dsp is de-activated after host computer system 105 reads this data.

6) Host computer system 105, which has been polling status register 910, reads the "dsp__data__rdy" bit and then uploads the data from data register 1030.

7) "Dsp__data__rdy" bit is reset following the read of data register 1030 and the cycle begins again.

DSP 130 provides a dedicated non-maskable interrupt input, nint__dbug. An interrupt signal will preferably be a two clkout1 cycle wide pulse, driven by debugger monitor 125, beginning with the rising edge of clkout1. This interrupt initiates the virtual monitor mode.

DSP 130 provides debugger monitor 125 with an "ifetch" signal that indicates whether the current program access from DSP 130 is an instruction fetch. This "ifetch" signal preferably is provided as early in the nint__dbus cycle as possible so that debugger monitor 125 can determine if the "ready__dsp" signal needs to be de-activated to insert wait states until host computer system 105 can download an instruction.

Debugger monitor 125 provides a "dbug__mode" signal to DSP 130 which indicates that the virtual monitor mode is active. This signal "dbug__mode" causes DSP 130 to read all instruction fetches from the DI(15:0) data__bus (FIG. 3).

DSP 130 preferably provides two dedicated interrupts for debugger monitor 125 to use. The hardware interrupt is preferably non-maskable. Whenever one of these interrupts occurs, DSP 130 saves the current program counter value. Before exiting the debugger, host computer system 105 will read the saved current program counter value. The debugger program will be exited with a special "branch" instruction that branches DSP 130 to a location specified by host computer system 105 to retrieve the current program counter value and also restores the interrupt masks.

A TRAP instruction will be used to branch DSP 130 to the resident monitor code, which will initiate the resident monitor mode.

Virtual monitor mode is a non-interruptable debugger mode, with the exception of a RESET or a non-masked NMI. Virtual monitor mode halts DSP 130 and masks all maskable interrupts. Complete control of DSP 130 is given to host computer system 105. Virtual monitor mode is used for instruction downloads, and for single stepping through software code.

There are three ways to enter virtual monitor mode. The first is through use of a hardware interrupt, the second is to start from a reset by use of the "dbug__rst__dsp" and "virtual__mode__en" bits in mode register 810, and the third is through use the of hardware breakpoints from breakpoint logic 435 or the SWI instruction.

For a virtual monitor mode hardware interrupt start, a "virtual__mode__en" bit of mode register 810 must be set. DSP 130 may be interrupted at any point by setting the "virtual__mode__int" bit in mode register 810. DSP 130 will save the program counter value, and then branch to location hex 000E. The debugger system decodes the instruction fetch at address hex 000E, and places a NOP instruction on the dsp__data__bus, di(15:0). The program counter will increment to address hex 000F, which is the location of the debugger instruction register. The debugger system sets the status register 910 "virtual__mode" and "dsp__rdy" bits, and de-activates the "ready__dsp" signal to DSP 130. At this point the virtual monitor mode is active and holding DSP 130 until an instruction can be downloaded from host computer system 105.

Virtual monitor mode started by a DSP 130 reset is used when it is not necessary to return DSP 130 to the place it was executing from when the debugger was started, and the current state of the processor is not needed. To start Virtual Monitor mode in this fashion, set the "virtual__mode__en" and "dbug__rst__dsp" bits of mode register 800. The "dbug__rst__dsp" bit resets DSP 130. The "dbug__rst__dsp" bit is de-activated to allow DSP 130 to run. DSP 130 will begin execution from program space location hex 0000, the NOP's are inserted on DSP 130 data__bus, di(15:0), and DSP 130 increments to location hex 000F, which is the location of the debugger instruction register 1130. The debugger "virtual__mode" and "dsp__rdy" bits of status register 910 are set, and de-activates the "ready__dsp" signal to DSP 130 is deactivated. At this point, "debugger" mode is active and holding DSP 130 until an instruction can be downloaded from host computer system 105.

Virtual monitor mode can be automatically re-started using the hardware breakpoint registers or the SWI instruction. Either hardware breakpoint registers are set, or an SWI is placed somewhere in the program during a previous debugger mode. The "virtual__mode__en" bit of mode register 810 remains set when virtual monitor mode is exited. When the condition specified in the breakpoint registers 1204, 1224, 1234 or 1254 is encountered, or an SWI instruction is executed, DSP 130 branches to location hex 000E or 0026 respectively. The instruction fetched from address hex 000E or 0026 is decoded, and a NOP instruction is placed on DSP 130 data_bus, di(15:0). The program counter will increment to address hex 000F or 0027, and the virtual monitor mode sets the status register 910 "virtual_ mode" and "dsp_rdy" bits, and de-activates the "ready_ dsp" signal to DSP 130. At this point virtual monitor mode is active and holding DSP 130 until an instruction can be downloaded from host computer system 105.

Once virtual monitor mode has been started, host computer system 105 will poll status register 910. When DSP 130 attempts the first instruction fetch, the "dsp_rdy" bit in status register 910 will be set, and the "ready_dsp" signals to DSP 130 will be de-activated. When host computer system 105 reads the "dsp_rdy" bit in status register 910, data is downloaded to data register 1030, if applicable, and an instruction will be downloaded to instruction register 1130. The "dsp_rdy" bit will be reset and the "ready_dsp" signal to DSP 130 will be activated. DSP 130 will then complete the instruction fetch and begin another, thus starting this sequence again. If host computer system 105 desires that the instruction downloaded be executed before issuing another instruction, the host computer system 105 inserts enough NOP instructions to fill the data_bus di(15:0) of DSP 130.

The host computer system 105 may download data to data register 1030 when the "dsp_rdy" bit is set in status register 910 and just prior to downloading a instruction that directs DSP 130 how to do manipulate that data. It is preferred that data register 1030 is not used with "repeat" commands because no status mechanism exists to inform host computer system 105 that DSP 130 is waiting for another data word to be downloaded. However, if desired, this implementation would require another signal from DSP 130 indicating a "repeat" condition. The "ready_dsp" signal would then be de-activated whenever DSP 130 attempts to read from data register 1030 and the "host_data_rdy" bit is not set. It is preferred not to implement this as the interface speed should be sufficient to download data one word at a time. This implementation would also add delay to the "ready" logic.

The result of an instruction being executed by DSP 130 may place data in data register 1030 for host computer system 105 to read. While in virtual monitor mode, whenever DSP 130 writes data into data register 1030, the "dsp_data_rdy" bit of status register 910 is set, and will then de-activate the "ready_dsp" signal to DSP 130 to prevent data register 1030 from being overwritten. The "dsp_data_rdy" bit indicates to host computer system 105 that the data in data register 1030 is valid and preferably is read before issuing another instruction to instruction register 1130. Since DSP 130 will immediately attempt an instruction fetch after writing to data register 1030, host computer system 105 will read both the "dsp_data_rdy" and "dsp_ rdy" bits set in status register 910. The "dsp_rdy" bit has a higher priority associated with it. Data register 1030 is preferably read before issuing another instruction to instruction register 1130 because the "ready_dsp" signal will not be re-activated until the data has been read. Once host computer system 105 has read data register 1030, the "dsp_data_rdy" bit is reset and instruction downloading may continue.

The last instruction to be downloaded to DSP 130 will be a special "branch" instruction. This instruction is a two word instruction. To exit the debugger mode, host computer system 105 will download the first word of the instruction, and then poll the status register 910 for the "dsp_rdy" bit indicating that DSP 130 is ready for the second word. Host computer system 105 will then set the "dbug_mode_rst" bit in the mode register 810 and then download the second word of the instruction to instruction register 1130. At the completion of the fetch of the second word of the by DSP 130, the debugger logic exits virtual monitor mode. Host computer system 105 is signaled that debugger mode is done when the "virtual_mode" bit is no longer set in the Status register 910. After executing the instruction, DSP 130 will re-enable the interrupt masks and branch to the address contained in the instruction.

Resident monitor mode is a non-intrusive interruptable debugger mode. This mode requires that the resident monitor code be linked in with the user's program. Resident Monitor mode is used for single stepping through software code, setting hardware breakpoints and monitoring registers while allowing other interrupts to be serviced.

There are two preferred ways to enter the resident monitor mode. The first is to set the "resident_mode_int" bit in status register 910. The second is through use of a TRAP instruction or a hardware breakpoint.

Resident monitor mode can be initiated by setting the "resident_mode_int" bit in status register 910. This causes an interrupt pulse to be driven to DSP 130 preferably at the lowest level priority interrupt input. The DSP 130 should "branch" to the resident monitor code when this interrupt is serviced. The resident monitor code will set the "resident_ mode" bit in status register 910 to indicate to host computer system 105 that resident monitor mode is operational. Host computer system 105 may then download instructions or data to data register 1030. Resident monitor mode may be started, or re-started, when a hardware breakpoint or a TRAP instruction is encountered. When hardware breakpoint registers 1204, 1224, 1234, 1254 have been set and enabled, or a TRAP instruction has been placed somewhere in the code during a previous debugger mode, and the "virtual_mode_ en" bit in status register 910 is not set, DSP 130 will "branch" to the resident monitor code when the breakpoint is encountered, or a TRAP is executed.

Once the resident monitor mode has been initiated, the "host_data_rdy" bit in status register 910 is set. Debugger monitor 125 polls status register 910 waiting for the "host_ data_rdy" bit to be set, and then directs DSP 130 to read data register 1030. The "host_data_rdy" bit is reset automatically after DSP 130 reads data register 1030. Host computer system 105 polls status register 910 waiting for "host_data_rdy" to be reset and then can download again. Or, if the instruction was to return data, host computer system 105 will wait for the "dsp_data_rdy" bit to be set and then upload the data in data register 1030. Host computer system 105 can then download another instruction and the cycle repeats. This process can be interrupted at any point by a higher priority interrupt at DSP 130.

The resident monitor mode is exited by setting the "dbug_mode_rst" bit in mode register 810, and then downloading a RETURN instruction. After the RETURN instruction has been read, the "resident_mode" bit in status register 910 is reset.

Hardware breakpoints may be set while in the virtual monitor mode, or resident monitor mode by accessing the various hardware breakpoint registers 1204, 1224, 1234, 1254. In addition, SWI or TRAP instructions can be manually inserted into the program.

Breakpoints will restart the virtual monitor mode when the "virtual_mode_en" bit is set. Virtual Monitor mode is automatically started when DSP 130 encounters the nint_dbug signal, or executes an SWI instruction. An nint_dbug interrupt is generated by debugger monitor 125 in response to a breakpoint HWI flag, or will insert an SWI instruction into the pipeline following a breakpoint SWI flag. Debugger monitor 125 starts virtual monitor mode monitoring the instruction fetch from the interrupt locations, hex 000E or 0026, and "virtual_mode_en" is set in mode register 810. Host computer system 105 detects that the virtual monitor mode is again active since debugger monitor 125 sets the "virtual_mode" bit in status register 910.

Breakpoints will restart the resident monitor mode when the "virtual_mode_en" bit is not set. DSP 130 will branch to the resident monitor mode when DSP 130 encounters the nint_6 signal, or executes a TRAP instruction. Debugger monitor 125 generates the nint_6 interrupt in response to a breakpoint HWI flag, or will insert a TRAP instruction onto DSP 130 data-bus di(I 5:0) following a breakpoint SWI flag. Host computer system 105 detects that the resident monitor mode is again active since the resident monitor program will set the "resident_mode" bit in status register 910. Table 3 below lists the preferred signals used by the present invention.

TABLE 3

Debugger Monitor 125 I/O Pin List

| SIGNAL NAME | I/O | DESCRIPTION |
|---|---|---|
| ext_data_in[15:0] | I | 16 bit external data_bus from memory peripheral 340. |
| dsp_data_in[15:0] | O | 16 bit data_bus input to DSP 130 core. |
| dsp_data_out[15:0] | I | 16 bit data_bus output from DSP 130 core. |
| dsp_address[15:0] | I | 16 bit DSP address bus from DSP 130 core. |
| clkout1 | I | clkout1 signal from DSP core. |
| n_ps | I | Program memory space select, active low. |
| n_ds | I | Data memory space select, active low. |
| n_is | I | I/O space select, active low. |
| n_rd | I | Read enable, active low. |
| n_we | I | Write enable, active low. |
| n_dbug_int | O | Virtual monitor mode interrupt to DSP 130. |
| n_mon_int | O | Resident monitor mode interrupt to DSP 130. |
| dbug_mode | O | Indicates to DSP 130 that virtual monitor mode is active and that all instruction fetches will come off of the data_bus. |
| ready_in | I | Input from peripheral wait state generator 326. |
| ready_out | O | Input to DSP 130 READY pin. |
| ifetch | I | From DSP 130, indicates an instruction fetch cycle. |
| n_reset | I | System chip reset, active low. |
| jtck | I | JTAG clock. |
| jtms | I | JTAG test mode select. |
| jtdi | I | JTAG test data in. |
| jntrst | I | JTAG test reset |
| jtdo | O | JTAG test data out. |
| extest | O | JTAG "EXTEST" test mode. |
| intest | O | JTAG "INTEST" test mode. |
| sample | O | JTAG "SAMPLE" test mode. |
| runbist | O | JTAG "RUNBIST" test mode. |
| idcode | O | JTAG "IDCODE" test mode. |
| usercode | O | JTAG "USERCODE" test mode. |
| jtag_user_1 | O | JTAG user definable test mode 1. |
| jtag_user_2 | O | JTAG user definable test mode 2. |
| jtag_user_3 | O | JTAG user definable test mode 3. |
| jtag_user_4 | O | JTAG user definable test mode 4. |
| capture_dr | O | JIAG "CAPTURE DR" state. |
| shift_dr | O | JTAG "SHIFT_DR" state. |
| update_dr | O | JTAG "UPDAIE_DR" state. |
| tdo_user | I | test data out from user registers. |

Numerous variations and modifications of the embodiment described above may be effected without departing from the spirit and scope of the novel features of the invention. It is to be understood that no limitations with respect to the specific device illustrated herein are intended or should be inferred. It is, of course, intended to cover by the appended claims all such modifications as fall within the scope of the claims.

We claim:

1. A virtual monitor controller comprising:

a data storage device coupled to receive and output data;

an instruction storage device coupled to receive and output instructions;

a status storage device coupled to receive and output status data; and a mode storage device coupled to receive and output mode data, said mode storage device configured to receive a fixed signal and a user selectable signal, and combine said signals to provide an interrupt signal which is selectively masked based on a valve of said user selectable signal.

2. The controller of claim 1 wherein the controller is coupled to a host system and a processor.

3. The controller of claim 1 wherein the controller is coupled to an interface.

4. The controller of claim 3 wherein the interface is compatible with a JTAG standard.

5. The controller of claim 1 wherein the controller is coupled to breakpoints logic.

6. A debugger/monitor system comprising:

a host system;

a debugger/monitor controller in communication with said host system; and a digital processor in communication with said controller, said controller configured to provide a user-selectable mask signal to said digital processor based on a user-defined signal which is received by said controller from said host system.

7. The system of claim 6 wherein the controller is coupled between the processor and IC logic.

8. The system of claim 6 wherein the system is operable in a virtual monitor mode and a resident monitor mode.

9. The system of claim 6 further comprising an interface between the host system and the digital processor.

10. The system of claim 9 wherein the controller controls information between the interface and the digital processor.

11. The system of claim 9 wherein the interface is a JTAG interface.

12. The system of claim 6 wherein the controller is coupled to hardware breakpoints logic.

13. A method of operating a virtual monitor comprising the steps of:

intercepting an instruction fetch from a microprocessor;

downloading an instruction from a host computer; and operating the microprocessor with the instruction, wherein said instruction includes a user maskable signal, and wherein a number of interrupts of said microprocessor are masked, and said number depends on a value of said user maskable signal.

14. The method of claim 13 wherein the steps are repeated.

15. The method of claim 13 further comprising the step of automatically masking a plurality of the microprocessor.

16. An embedded integrated circuit comprising a debugger monitor configured to output a user maskable signal.

17. The integrated circuit of claim 16 wherein the debugger circuit is coupled between a processor and memory.

18. A method of virtual monitor mode debugging comprising the step of controlling a data bus of a processor during an instruction fetch by ignoring an address from the processor and providing an instruction on the data bus, and masking a selectable number of interrupts based on a value of a user maskable signal.

19. A method of downloading an instruction and controlling an embedded processor comprising the steps of:

attempting a processor instruction fetch;

deactivating a ready processor signal;

setting a processor ready bit;

downloading an instruction responsive to the reactivated ready processor signal;

receiving a user maskable signal;

masking a selectable number of interrupts of a processor based on a value of said user maskable signal;

resetting the processor ready bit;

reactivating the ready processor signal; and executing the instruction responsive to the reactivated ready processor signal.

20. The method of claim 19 wherein the steps are repeatable.

21. The method of claim 19 further comprising the steps of:

setting a processor data ready bit if the result of the instruction previously executed stored data;

uploading the stored data;

resetting the processor data ready bit; and deactivating the ready processor signal after the stored data is read.

* * * * *